(12) United States Patent
Kang

(10) Patent No.: US 11,283,483 B2
(45) Date of Patent: Mar. 22, 2022

(54) CONTACTLESS CARD READING EMPLOYING GAIN AND ATTENUATION CONTROL

(71) Applicant: SAMSUNG ELECTRONICS CO., LTD., Suwon-si (KR)

(72) Inventor: Hyunjae Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/023,923

(22) Filed: Sep. 17, 2020

(65) Prior Publication Data

US 2021/0184728 A1 Jun. 17, 2021

(30) Foreign Application Priority Data

Dec. 17, 2019 (KR) ........................ 10-2019-0168535

(51) Int. Cl.
*H04B 5/00* (2006.01)
*H04B 5/02* (2006.01)
*H04B 1/38* (2015.01)

(52) U.S. Cl.
CPC .......... *H04B 5/0031* (2013.01); *H04B 5/0037* (2013.01); *H04B 5/0062* (2013.01); *H04B 5/0093* (2013.01)

(58) Field of Classification Search
CPC .......... H04B 1/04; H04B 1/38; H04B 1/3827; H04B 1/40; H04B 5/00; H04B 5/0031; H04B 5/0037; H04B 5/02; H04B 5/0025; H04B 5/0056; H04B 5/0062; H04B 5/0075; H04B 5/0081; H04B 5/0093; H04B 10/07955; H04W 4/80; H04M 1/72412

See application file for complete search history.

(56) References Cited

U.S. PATENT DOCUMENTS

| 4,634,997 | A | * | 1/1987 | Tompsett ................. H03G 3/30 330/129 |
| 7,283,013 | B2 | * | 10/2007 | Arisawa ............... G06K 7/0008 375/295 |
| 7,817,962 | B2 | * | 10/2010 | Zolfaghari ................ H03F 3/24 455/42 |
| 8,305,198 | B2 | | 11/2012 | Donato |
| 9,384,373 | B2 | | 7/2016 | Marcu et al. |
| 9,571,168 | B2 | | 2/2017 | Moon et al. |
| 9,654,186 | B2 | * | 5/2017 | Nakayama .......... H04B 5/0056 |

(Continued)

FOREIGN PATENT DOCUMENTS

| JP | 2002170082 | A | * | 6/2002 |
| JP | 2006-203466 | | | 8/2006 |

(Continued)

*Primary Examiner* — Quochien B Vuong
(74) *Attorney, Agent, or Firm* — F. Chau & Associates, LLC

(57) ABSTRACT

A contactless integrated circuit (IC) card reader configured to communicate with a contactless IC card includes an antenna circuit, a variable amplifier that amplifies a carrier signal at an amplification gain and outputs the amplified carrier signal to the antenna circuit as a transmit signal, a variable attenuator that attenuates a receive signal received through the antenna circuit at an attenuation ratio, and a controller that controls the amplification gain and the attenuation ratio based on the attenuated receive signal.

17 Claims, 17 Drawing Sheets

(56) References Cited

U.S. PATENT DOCUMENTS

| | | | |
|---|---|---|---|
| 10,346,732 B2* | 7/2019 | Philip | H04B 5/02 |
| 10,361,735 B2* | 7/2019 | Myoung | H04B 5/0075 |
| 10,644,739 B2* | 5/2020 | Cordier | H04B 5/00 |
| 2007/0122941 A1* | 5/2007 | Ota | G06K 7/0008 |
| | | | 438/107 |
| 2019/0097731 A1 | 3/2019 | Ide | |

FOREIGN PATENT DOCUMENTS

| | | |
|---|---|---|
| JP | 2008-187227 | 8/2008 |
| JP | 4285656 | 6/2009 |
| JP | 2018-067030 | 4/2018 |

* cited by examiner

CONTACTLESS CARD READING EMPLOYING GAIN AND ATTENUATION CONTROL

CROSS-REFERENCE TO RELATED APPLICATIONS

This application claims priority under 35 U.S.C. § 119 to Korean Patent Application No. 10-2019-0168535 filed on Dec. 17, 2019, in the Korean Intellectual Property Office, the disclosures of which are incorporated by reference herein in their entireties.

TECHNICAL FIELD

Embodiments disclosed herein relate generally to near field communication (NFC) and more particularly to an NFC reader, an operation method of the NFC reader, and an electronic device including the NFC reader.

DISCUSSION OF RELATED ART

A radio frequency identification (RFID) system may wirelessly recognize information stored in a tag by using radio waves. NFC is one example of RFID technology and provides contactless data communication between devices at a short distance. An NFC system may operate in an active communication mode or a passive communication mode depending on the capabilities of the NFC devices or a selected operation mode. An NFC system may operate in a peer-to-peer (P2P) mode, a card emulation mode, or a reader/writer mode, depending on the protocol compatibilities of the NFC devices.

SUMMARY

Embodiments of the inventive concept provide a near field communication reader with improved performance, an operation method of the near field communication reader, and an electronic device including the near field communication reader.

According to an exemplary embodiment, a contactless integrated circuit (IC) card reader configured to communicate with a contactless IC card includes an antenna circuit, a variable amplifier that amplifies a carrier signal at an amplification gain and outputs the amplified carrier signal to the antenna circuit as a transmit signal, a variable attenuator that attenuates a receive signal received through the antenna circuit at an attenuation ratio, and a controller that controls the amplification gain and the attenuation ratio based on the attenuated receive signal (e.g., prior to or after any subsequent filtering).

According to an exemplary embodiment, an electronic device configured to support near field communication (NFC) a processor, an antenna circuit, an NFC reader circuit that receives reception data from an external NFC card through the antenna circuit based on passive load modulation (PLM), under control of the processor, in a reader mode, and an NFC card circuit that outputs modulated transmission data to the antenna circuit under control of the processor, in a card mode, and the NFC reader circuit includes a variable amplifier that amplifies a carrier signal at an amplification gain and outputs the amplified carrier signal to the antenna circuit as a transmit signal, a variable attenuator that attenuates a receive signal received through the antenna circuit at an attenuation ratio, the receive signal including the reception data, and a controller that controls the amplification gain and the attenuation ratio based on the attenuated receive signal (e.g., prior to or after any subsequent filtering).

According to an exemplary embodiment, an operation method of a contactless integrated circuit (IC) card reader configured to communicate with a contactless IC card includes setting each of an amplification gain and an attenuation ratio to first and second initial values, respectively, outputting a transmission signal amplified based on the amplification gain set to the first initial value, attenuating a receive signal received from the contactless IC card based on the attenuation ratio set to the second initial value and generating an attenuated receive signal, adjusting the amplification gain and the attenuation ratio respectively based on the attenuated receive signal (e.g., prior to or after any subsequent filtering) and a reference level, and performing near field communication with the contactless IC card based on the adjusted amplification gain and the adjusted attenuation ratio.

BRIEF DESCRIPTION OF THE FIGURES

The above and other aspects and features of the inventive concept will become apparent by describing in detail exemplary embodiments thereof with reference to the accompanying drawings.

DETAILED DESCRIPTION

Below, embodiments of the inventive concept are described in detail and clearly to such an extent that an ordinary one in the art may readily implement the inventive concept.

Herein, the term "attenuation ratio" refers to an attenuation characteristic of an attenuator, and is defined as a ratio of input signal power to the attenuator vs. output signal power of the attenuator. Thus, a relatively high attenuation ratio corresponds to relatively high attenuation that occurs through the attenuator.

Components described in the specification by using terms such as "part", "unit", "module", etc. and function blocks illustrated in drawings may be implemented using software, hardware, or a combination thereof. Some examples of software include machine code, firmware, embedded code, and application software. For example, hardware may include an electrical circuit, an electronic circuit, a processor, a computer, an integrated circuit, integrated circuit cores, a passive element, or a combination thereof.

Figure 1:
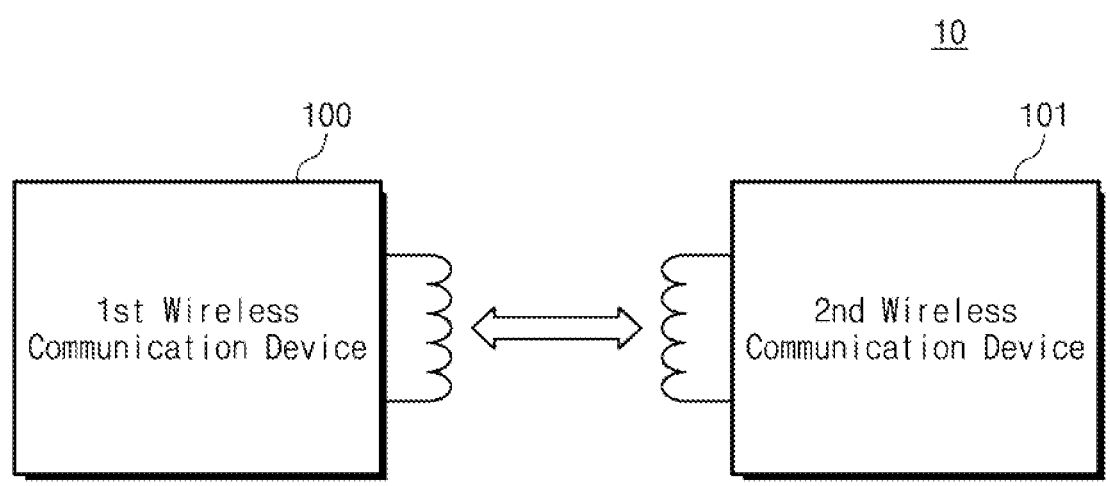
FIG. 1 is a block diagram illustrating a communication system according to an embodiment of the inventive concept.

FIG. 1 is a block diagram illustrating a communication system 10 according to an embodiment of the inventive concept. The communication system 10 may include a first wireless communication device 100 and a second wireless communication device 101. In an exemplary embodiment, the communication system 10 may be a system supporting near field communication or contactless communication. In an exemplary embodiment, the first and second wireless communication devices 100 and 101 may be NFC devices supporting near field communication.

In an exemplary embodiment, the communication system 10 may be an NFC system. In an NFC system, a technique known as load modulation may be used to communicate data from the tag to the reader. With load modulation, an RF link between the reader and the tag is akin to a transformer, where the transmitting antenna of the reader is similar to a primary transformer and the tag's antenna is similar to a secondary transformer. An RF carrier is transmitted by the reader and received by the tag's antenna, and modulation circuitry within the tag modulates the RF carrier, thereby causing slight variations in the RF carrier amplitude as measured by receiving circuitry at the reader. The variations thereby represent data communicated from the tag. Thus, the loading of the field acts as a communication path back to the reader. In passive load modulation (PLM), the RF carrier transmitted by the reader also powers circuitry within the tag.

The first and second wireless communication devices 100 and 101 may exchange information or data through electromagnetic induction. For example, either of the first and second wireless communication devices 100 and 101 may operate in a reader mode or a card mode. In the case where the first wireless communication device 100 operates in the reader mode, the second wireless communication device 101 may operate in the card mode. In this case, the first wireless communication device 100 may transmit a command to the second wireless communication device 101, the second wireless communication device 101 may provide relevant data to the first wireless communication device 100 through electromagnetic induction in response to the command received from the first wireless communication device 100. The first and second wireless communication devices 100 and 101 may operate a peer to peer (P2P) mode, a card emulation mode, or a reader/writer mode depending on device capability and/or a selected operation mode. In an exemplary embodiment, the wireless communication between the first and second wireless communication devices 100 and 101 may support various communication schemes defined by various NFC-related standards such as ISO1443, ISO18092, and ISO15693.

In an exemplary embodiment, the first and second wireless communication devices 100 and 101 (hereafter just "devices 100 and 101" for brevity) may operate in an active communication mode or a passive communication mode depending on device capability and/or a selected operation mode. For example, each of the devices 100 and 101 may support active communication or passive communication depending on whether the respective device includes its own power source. In the case where each of devices 100 and 101 includes its own power source, devices 100 and 101 may operate based on the active communication mode. Alternatively, if device 100 includes its own power source and device 101 does not, then device 100 may operate based on the active communication mode, and device 101 may operate based on the passive communication mode. In this example, device 101 obtains operating power from an electromagnetic field of a carrier signal output by device 100.

Figure 2:
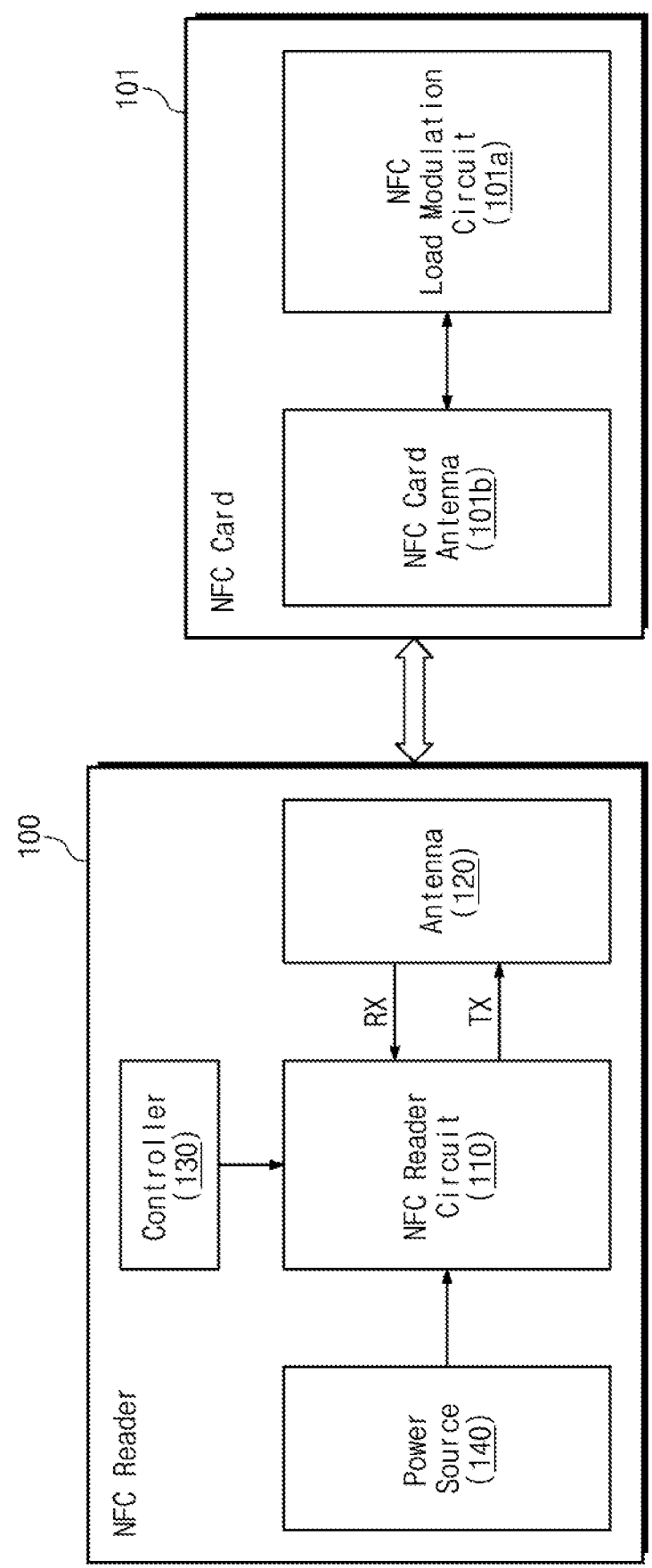
FIG. 2 is a block diagram illustrating example first and second wireless communication devices of FIG. 1 in detail.
Figure 3:
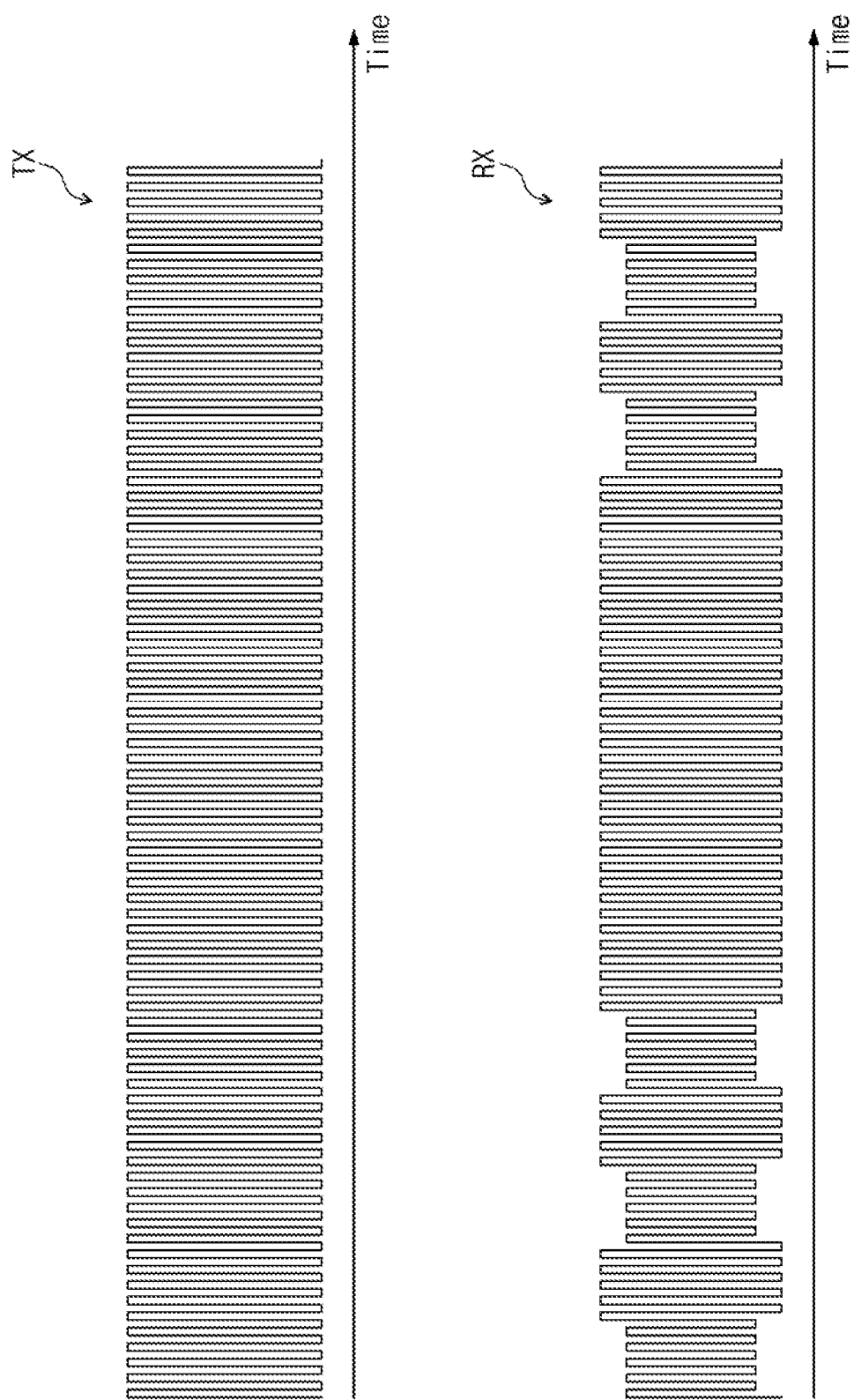
FIG. 3 illustrates example near field communication signal waveforms based on passive load modulation.

FIG. 2 is a block diagram illustrating example first and second wireless communication devices of FIG. 1 in detail. FIG. 3 illustrates near field communication signal waveforms based on passive load modulation. Below, to facilitate description of technical ideas of the inventive concept, it will be assumed as an example that device 100 includes its own power source and operates in a reader mode and device 101 does not include its own power source and operates in a card mode. Under this assumption, below, device 100 is referred to as an "NFC reader" 100, and device 101 is referred to as an "NFC card" 101. Here, the NFC reader 100 may "receive data" from the NFC card 101 due to the loading of circuitry at device 100 based on passive load modulation (PLM) performed by NFC card 101. To this end, the NFC card 101 may be said to "transmit data" to the NFC reader 100 through use of PLM. In an alternative embodiment, both the NFC reader 100 and NFC card 101 operate in the active mode and NFC card still implements load modulation to communicate data, but the load modulation circuitry is powered by the NFC card 101's own power source. In such an embodiment, the amplification gain and attenuation control as described below for the PLM embodiment may be applied in substantially the same way.

In an exemplary embodiment, an "NFC card" may be one type of a contactless IC card or tag and an "NFC reader" may be one type of contactless IC reader. Thus, while the below description discusses embodiments of the inventive concept in the context of an "NFC reader" and an "NFC card", other types of contactless IC readers, cards and tags may be substituted. Hence, terms such as "contactless IC card reader" and "contactless IC card" may be substituted.

Referring to FIGS. 1 to 3, the NFC reader 100 and the NFC card 101 may communicate with each other based on passive load modulation (PLM). For example, the NFC reader 100 may include an NFC reader circuit 110, an antenna circuit 120, a power source 140, and a controller 130. The NFC card 101 may include an NFC load modulation circuit 101a and an NFC card antenna 101b. Each of the antennas 120 and 101b may be a coil antenna or other type of near field antenna.

The NFC reader circuit 110 may provide a transmission signal TX having a given frequency to the antenna circuit 120. For example, as illustrated in FIG. 3, the transmission signal TX may be a clock signal having a given frequency. In an exemplary embodiment, the transmission signal TX may have a frequency corresponding to a carrier signal of an NFC type reader, e.g., defined by the NFC standard. In an exemplary embodiment, the carrier signal may have a frequency of 13.56 MHz. In this case the NFC reader 100 and the NFC card 101 may perform contactless near field communication based on a 13.56 MHz band.

The antenna circuit 120 may generate an electromagnetic field based on the transmission signal TX. The electromagnetic field generated by the antenna circuit 120 may be provided to the NFC card antenna 101b. The NFC reader circuit 110 may receive a receive signal (interchangeably, "reception signal") RX from the antenna circuit 120.

The receive signal RX may be a signal corresponding to a result of combining a signal, which corresponds to data provided from the NFC load modulation circuit 101a using PLM through the NFC card antenna 101b, and the transmission signal TX. For example, as illustrated in FIG. 3, the receive signal RX may be a signal in which the transmission signal TX and information modulated by the NFC load modulation circuit 101a are combined. Thus, the receive signal RX may be a signal that is obtained by combining the modulated information and the carrier signal. In other words, the receive signal RX may be a modified version of the carrier signal, where the difference between an unmodified carrier signal, and the modified version of the carrier signal, represents the modulated data ("reception data") communicated from the NFC load modulation circuit 101a. The NFC reader circuit 110 may determine the reception data provided from the NFC card 101 by demodulating the receive signal RX. Hence, the NFC reader 100 and the NFC card 101 may communicate with each other based on PLM. In an exemplary embodiment, the NFC load modulation circuit 101a may modulate data using an amplitude shift keying (ASK) modulation technique. Correspondingly, the NFC reader 100 may demodulate data from the NFC card 101 using ASK demodulation. Used together, PLM is a communication method for transmitting/receiving data, and ASK is a way to modulate data. However, other modulation schemes may be substituted. For example, other modulation techniques (e.g., FSK) may be used to modulate data, and other data coding methods may be alternatively used, such as Manchester coding, Miller coding, and modified Miller coding.

The power source 140 may provide power to the NFC reader circuit 110. In an exemplary embodiment, the power source 140 may include various power storage elements such as a battery and a capacitor. In an exemplary embodiment, the NFC reader circuit 110 may be configured to generate the transmission signal TX by using the power from the power source 140.

The controller 130 may control an operation of the NFC reader circuit 110. The controller 130 may control amplification gains of various variable amplifiers included in the NFC reader circuit 110, and an attenuation ratio of a variable attenuator included therein. For example, the level of the receive signal RX (interchangeably herein, "amplitude" or "magnitude" of the receive signal) may change depending on a physical distance between the NFC reader 100 and the NFC card 101.

In detail, in the case where a physical distance between the NFC reader 100 and the NFC card 101 increases, the level of the receive signal RX may become relatively low; in the case where a physical distance between the NFC reader 100 and the NFC card 101 decreases, the level of the receive signal RX may become relatively high. In general, in the case where the receive signal RX level is within a given range, the efficiency of communication of the NFC reader circuit 110 may be improved. The given range may be a pre-established range stored in memory within the NFC reader 100.

A conventional NFC reader increases a receive signal level by amplifying a relatively low level of the receive signal using an amplifier. However, in this case, noise within the receive signal is amplified together with the reception data, resulting in a decrease in the sensitivity of the receive signal.

On the other hand, the NFC reader circuit 110 according to an embodiment of the inventive concept may be configured to attenuate the receive signal RX for the purpose of improving the efficiency of communication of the NFC reader circuit 110. Herein, as noted earlier, the higher the attenuation ratio, the more the receive signal is attenuated. Thus, in relative terms, an attenuation ratio said to be relatively high means that the level of the receive signal RX is attenuated relatively more; that an attenuation ratio is relatively small means that the level of the receive signal RX is attenuated relatively less. In addition, the NFC reader 100 according to an embodiment of the inventive concept may improve the efficiency of communication by varying the attenuation ratio applied to the receive signal RX and/or an amplification gain of the transmission signal TX depending on the level of the receive signal RX. In this regard, as described above, the controller 130 may be a gain controller configured to control both an amplification gain and an attenuation ratio of the NFC reader 100. In an exemplary embodiment, the controller 130 may be included in a separate processor (not illustrated) within the NFC reader 100. An operation method of the NFC reader 100 according to an embodiment of the inventive concept will be described with reference to the drawings below.

Figure 4:
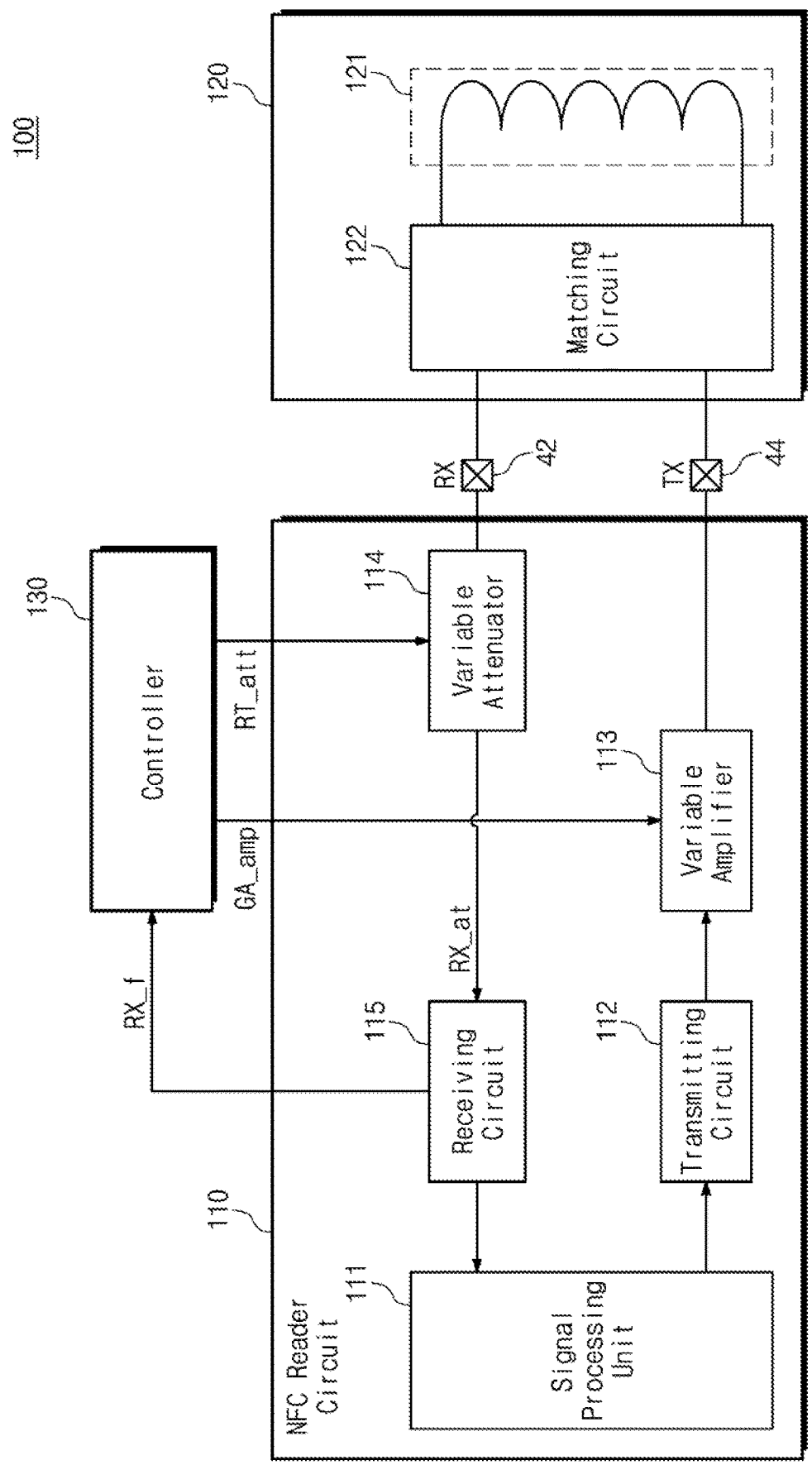
FIG. 4 is a block diagram illustrating an example configuration for the NFC reader of FIG. 2 in detail.

FIG. 4 is a block diagram illustrating an example configuration of the NFC reader of FIG. 2 in detail. In an exemplary embodiment, for brevity of illustration and for convenience of description, components that are unnecessary to describe the inventive concept are omitted in FIG. 4. For instance, the NFC reader 100 may further include any other function blocks such as an analog to digital converter (ADC), a modem, a rectifier, and an envelope detector.

Referring to FIGS. 1 to 4, the NFC reader 100 may include the NFC reader circuit 110 and the antenna circuit 120. The NFC reader circuit 110 may include a signal processing unit 111, a transmission circuit 112, a variable amplifier 113, a variable attenuator 114, and a reception circuit 115. A receive terminal 42 and a transmit terminal 44 may electrically connect the NFC reader circuit 110 and the antenna circuit 120.

The signal processing unit 111 may be configured to control the transmission circuit 112 or to process a signal received from the reception circuit 115.

The transmission circuit 112 may be configured to generate a signal to be amplified by the variable amplifier 113. For example, the transmission circuit 112 may be a clock generator that generates a clock signal that is amplified by the variable amplifier 113 to generate the transmission signal TX. The transmission circuit 112 may be configured to generate the clock signal under the control of the signal processing unit 111. In an exemplary embodiment, the clock signal generated from the transmission circuit 112 may be a carrier signal used for the NFC reader 100 and the NFC card 101 to communicate with each other. In an exemplary embodiment, the signal processing unit 111 may modulate information or a command to be transmitted to the NFC card 101 based on the carrier signal and may control the transmission circuit 112 based on the modulated result. The transmission circuit 112 may provide the carrier signal, in which the modulated result is included, that is, a modulated carrier signal to the variable amplifier 113 under control of the signal processing unit 111.

The variable amplifier 113 may be configured to amplify the clock signal or the modulated signal from the transmission circuit 112 and to output the transmission signal TX. In an exemplary embodiment, an amplification gain GA_amp of the variable amplifier 113 may be managed or controlled by the controller 130. The transmission signal TX may be provided to the antenna circuit 120.

The antenna circuit 120 may include an antenna 121 and a matching circuit 122. The matching circuit 122 may be configured to adjust a resonant frequency of the antenna 121 or to match impedance between the antenna 121 and the NFC reader circuit 110.

An electromagnetic field may be formed at the antenna 121 by the transmission signal TX provided to the antenna circuit 120. The antenna 121 may be configured to receive an electromagnetic field including information about modulated data from the NFC card 101. The receive signal RX may be generated as the electromagnetic field including the information about the modulated data from the NFC card 101 and the electromagnetic field generated by the transmission signal TX are combined.

The variable attenuator 114 may attenuate the receive signal RX based on an attenuation ratio RT_att. For example, as described above, to improve the efficiency of communication of the NFC reader 100, the level of the receive signal RX should be within a given range. That is, the variable attenuator 114 may attenuate the receive signal RX such that the level of the receive signal RX is within the given range. In an exemplary embodiment, the attenuation ratio RT_att of the variable attenuator 114 may be managed or controlled by the controller 130.

The reception circuit 115 may detect data provided from the NFC card 101 based on an attenuated receive signal RX_at. For example, the reception circuit 115 may generate a filtered receive signal RX_f by filtering the carrier signal from the attenuated receive signal RX_at. The filtering may improve the signal quality of the receive signal. For instance, an LC filter or the like within the reception circuit 115 may suppress signal energy at the carrier frequency relative to signal energy at expected upper and lower offset frequencies relative to the carrier frequency. In this manner, the reception data within the receive signal RX may be more easily and/or more accurately recovered.

The signal processing unit 111 may demodulate the data provided from the NFC card 101 based on the filtered receive signal RX_f from the reception circuit 115. For example, as described above, the NFC card 101 may modulate data based on ASK and may effectively transmit the modulated data to the NFC reader 100 through use of PLM. That is, the receive signal RX_f filtered by the reception circuit 115 may be data that are modulated based on ASK. Accordingly, the signal processing unit 111 may identify the data provided from the NFC card 101 by demodulating the filtered receive signal RX_f based using ASK demodulation.

The controller 130 may be configured to control the amplification gain GA_amp of the variable amplifier 113 and the attenuation ratio RT_att of the variable attenuator 114, individually or complementally. The controller 130 may be configured to control the amplification gain GA_amp of the variable amplifier 113 and the attenuation ratio RT_att of the variable attenuator 114, based on a level of the filtered receive signal RX_f. In detail, as the amplitude of the filtered receive signal RX_f becomes smaller, the accuracy of data detected by the reception circuit 115 may become lower. In this case, the controller 130 may increase the amplitude of the filtered receive signal RX_f by decreasing the attenuation ratio RT_att of the variable attenuator 114. However, in the case where the attenuation ratio RT_att of the variable attenuator 114 decreases, the level of the attenuated receive signal RX_at may relatively increase, resulting in a decrease of the efficiency of communication of the NFC reader 100. In this case, the level of the attenuated receive signal RX_at may be within the given range by making the amplification gain GA_amp of the variable amplifier 113 relatively small. That is, in various communication environments, the reception performance of the NFC reader 100 may be improved by controlling not only the attenuation ratio RT_att of the variable attenuator 114 but also the amplification gain GA_amp of the variable amplifier 113 individually, independently, actively, complementally, or in real time. In an exemplary embodiment, the attenuation ratio RT_att of the variable attenuator 114 may be determined or adjusted based on the amplification gain GA_amp of the variable amplifier 113. The adjustment of the amplification gain GA_amp may be correlated with the adjustment of the attenuation ratio RT_att to arrive an optimized relationship between the amplification gain GA_amp and the attenuation ratio RT_att that results in an optimum communication link. The optimum communication link may be defined as a communication link with signal quality that satisfies one or more metrics. Examples of such metrics include: receive signal level within a prescribed range; signal to noise ratio above a predefined threshold; and/or bit to error ratio above a certain threshold (e.g., as determined in an initial test sequence).

Each of the controller 130 and the signal processing unit 111 may include at least one processor/processing circuitry as well as a non-transitory memory that may store program instructions and data. The at least one processor may be a general purpose processor or a specific purpose processor that executes instructions read from the memory to carry out their respective operations described herein.

Hereafter, depending on the context of the discussion, "GA_amp" may refer to the gain of the variable amplifier 113 itself, or to a gain signal applied to the variable amplifier 113, where the gain signal represents a target gain for the variable amplifier 113.

Figure 5:
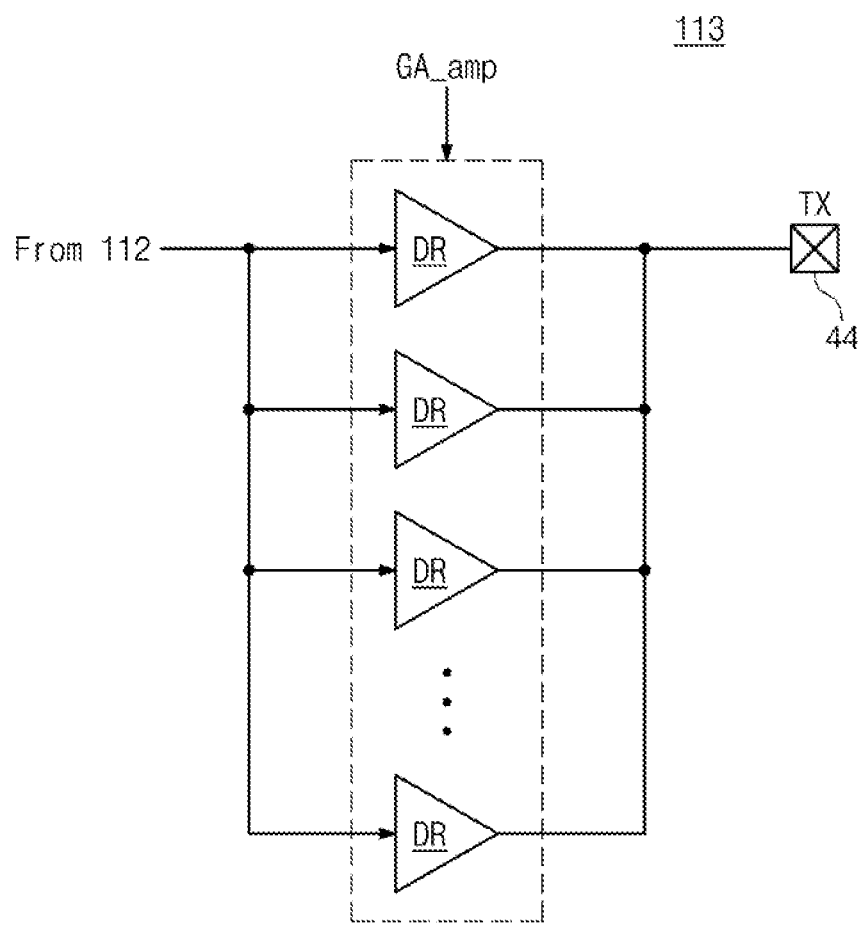
FIG. 5 is a diagram illustrating a variable amplifier of FIG. 4.

FIG. 5 is a diagram illustrating a variable amplifier of FIG. 4. The variable amplifier 113 illustrated in FIG. 5 is but one example of a variable amplifier configuration that may be utilized. Referring to FIGS. 4 and 5, the variable amplifier 113 may include a plurality of drivers DR. (The drivers DR are amplifiers themselves, and do not necessarily drive any other amplifier.) The plurality of drivers DR may be connected in parallel between the terminal 44 from which the transmission signal TX is output and the transmission circuit 112. Each of the plurality of drivers DR may amplify a clock signal or a modulated signal provided from the transmission circuit 112, and the signals amplified by the plurality of drivers DR may be combined, and the combined signal output as the transmission signal TX.

Each of the plurality of drivers DR may operate in response to an amplification gain signal GA_amp. For example, depending on the amplification gain signal GA_amp, a part of the plurality of drivers DR may be activated, and the remaining drivers thereof may be deactivated. As the number of activated drivers increases, the level of the transmission signal TX may increase. In other words, as the amplification gain indicated by signal GA_amp becomes greater, the number of activated drivers may increase, and thus, the level of the transmission signal TX may become higher. In the case where the amplification gain is set to the maximum value, all the drivers DR may be activated, and the level of the transmission signal TX may be set to the maximum value.

Figure 6A:
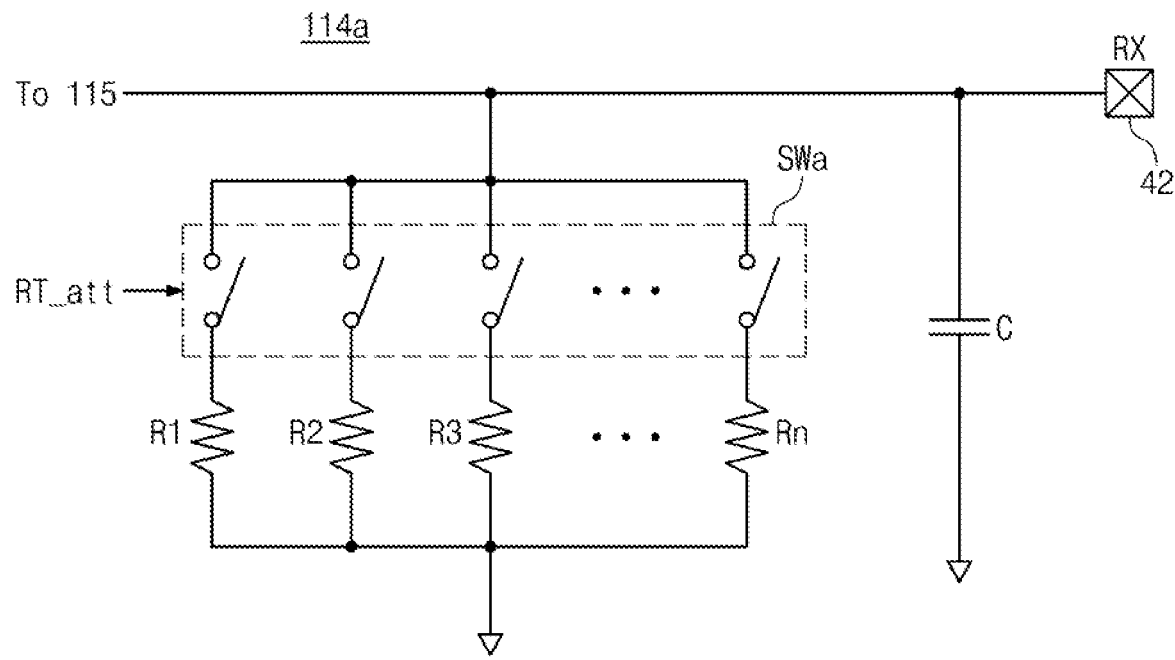
FIGS. 6A and 6B are diagrams illustrating respective exemplary variable attenuators that may be used for a variable attenuator of FIG. 4.
Figure 6B:
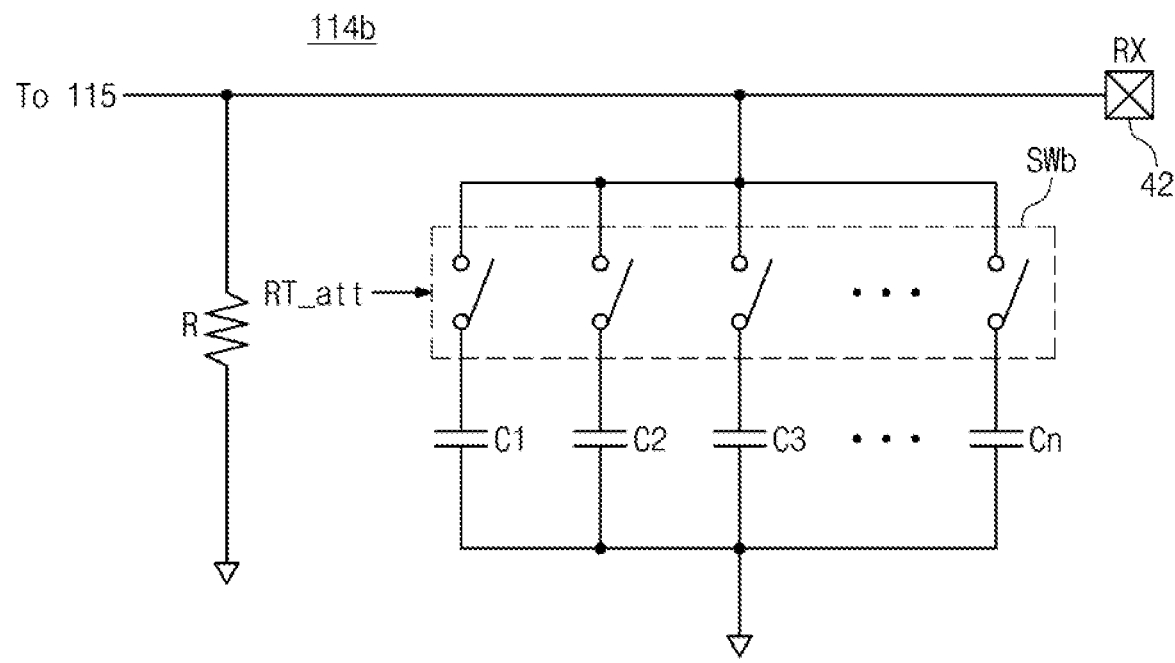

FIGS. 6A and 6B are diagrams illustrating respective exemplary variable attenuators that may be used for the variable attenuator 114 of FIG. 4. In an exemplary embodiment, configurations of variable attenuators 114a and 114b illustrated in FIGS. 6A and 6B are exemplary, and the inventive concept is not limited thereto. For example, the configurations of the variable attenuators 114a and 114b may be variously changed or modified, e.g., as discussed further below.

First, referring to FIGS. 4 and 6A, the variable attenuator 114a may include a capacitor "C", a switch circuit SWa, and a plurality of resistors R1 to Rn. The capacitor "C", the switch circuit SWa, and the plurality of resistors R1 to Rn may be connected in parallel between a terminal 42 to which the receive signal RX is input and a ground terminal. A plurality of switches of the switch circuit SWa may be connected with the plurality of resistors R1 to Rn, respectively. The plurality of switches of the switch circuit SWa may operate depending on the attenuation ratio RT_att. That is, as each of the plurality of switches of the switch circuit SWa is turned on or turned off depending on the attenuation ratio RT_att, a total resistance value of the plurality of resistors R1 to Rn may be variable. As such, the attenuation ratio RT_att of the variable attenuator 114 configured to attenuate the receive signal RX may be adjusted.

Next, referring to FIGS. 4 and 6B, the variable attenuator 114b may include a resistor "R", a switch circuit SWb, and a plurality of capacitors C1 to Cn. The resistor "R", the switch circuit SWb, and the plurality of capacitors C1 to Cn may be connected in parallel between the terminal to which the receive signal RX is input and the ground terminal. A plurality of switches of the switch circuit SWb may be connected with the plurality of capacitors C1 to Cn, respectively. The plurality of switches of the switch circuit SWb may operate depending on the attenuation ratio RT_att. That is, as each of the plurality of switches of the switch circuit SWb is turned on or turned off depending on the attenuation ratio RT_att, a total capacitance value of the plurality of capacitors C1 to Cn may be variable. As such, the attenuation ratio RT_att of the variable attenuator 114 configured to attenuate the receive signal RX may be adjusted.

As described above, each of the variable attenuator 114, 114a, and 114b may be configured as an RC filter including a variable resistor or a variable capacitor. In other embodiments, the variable attenuator 114 has both a variable resistor and a variable capacitor, or is a pure resistor network that omits capacitors. In still other embodiments, the variable attenuator 114 includes another type of filter (e.g., a variable LC filter or a variable RLC filter) configured to adjust an attenuation ratio.

Figure 7A:
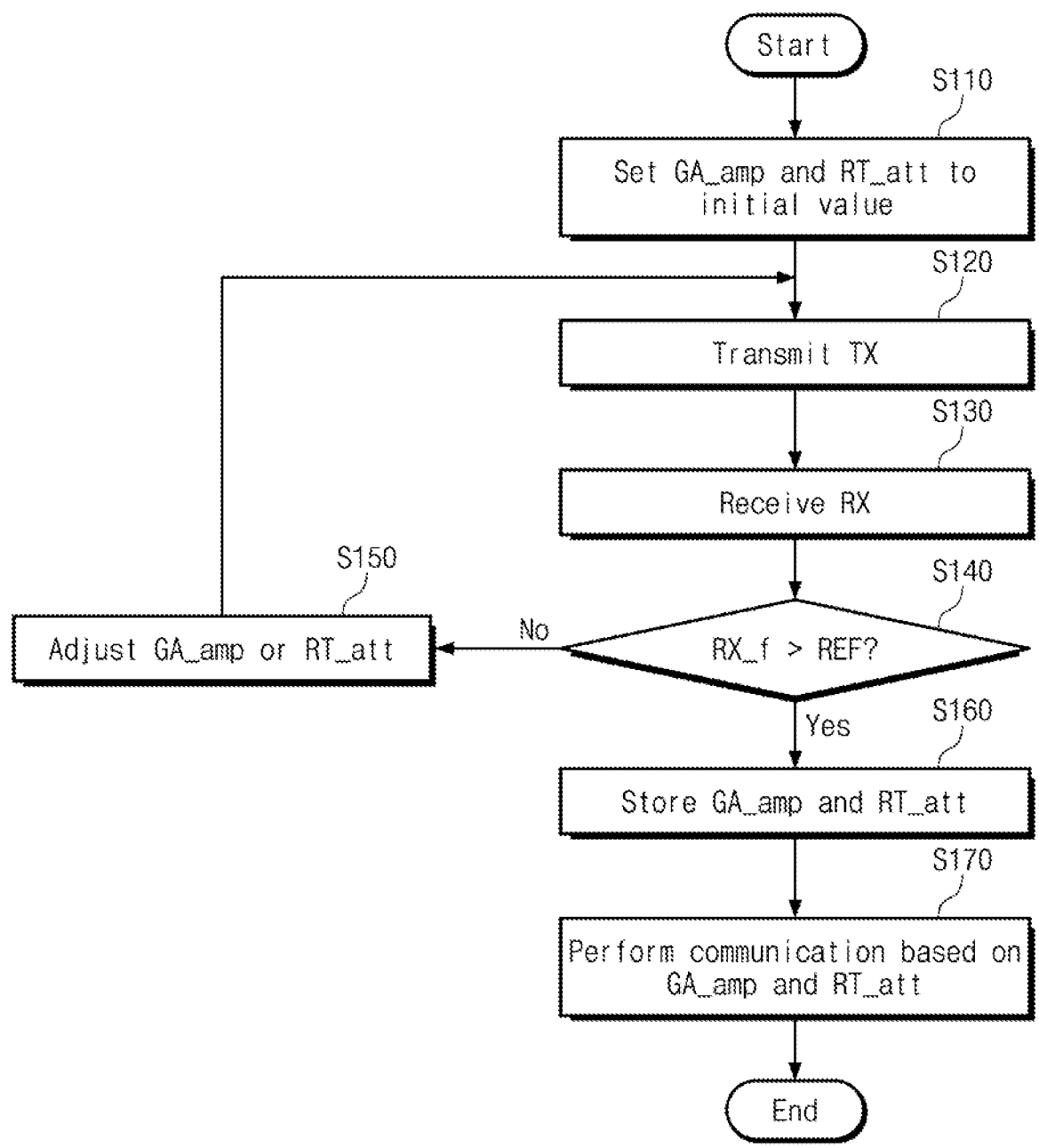
FIG. 7A is a flowchart illustrating an operation of an NFC reader of FIG. 4.

FIG. 7A is a flowchart illustrating operations of a method performed by the NFC reader of FIG. 4. Below, for convenience of description, it is assumed that the NFC reader 100 performs operations according to the flowchart of FIG. 7A. However, the inventive concept is not limited thereto. For example, operations according to the flowchart of FIG. 7A may be performed by various components included in the NFC reader 100 or by the NFC card 101 configured to communicate with the NFC reader 100.

Referring to FIGS. 4 and 7A, in operation S110, the NFC reader 100 may set the amplification gain GA_amp and the attenuation ratio RT_att to initial values, respectively. In an exemplary embodiment, the initial value of the amplification gain GA_amp may be the maximum value, and the initial value of the attenuation ratio RT_att may be a value corresponding to the amplification gain GA_amp being the maximum value. For example, the initial value of the attenuation ratio RT_att may indicate an attenuation ratio at which the receive signal RX is within the given range in the case where the amplification gain GA_amp is the maximum value.

In operation S120, the NFC reader 100 may transmit the transmission signal TX. For example, the transmission signal TX may be a signal that is amplified based on the amplification gain GA_amp set in operation S110. In an exemplary embodiment, in operation S120, the transmission signal TX thus transmitted may include information or a command for detecting the NFC card 101 or may include information or a command for reading data from the NFC card 101.

In operation S130, the NFC reader 100 may receive the receive signal RX. For example, the NFC card 101 may output a modulation signal including modulated information of data in response to the transmission signal TX output or emitted from the NFC reader 100. The receive signal RX may be generated as the transmission signal TX and the modulated signal are combined at the antenna circuit 120 of the NFC reader 100. In an exemplary embodiment, the level of the receive signal RX may be attenuated depending on the attenuation ratio RT_att set in operation S110.

In operation S140, the NFC reader 100 may compare the filtered receive signal RX_f and a reference level REF. For example, for the NFC reader 100 to detect data normally or optimally, the amplitude of the filtered receive signal RX_f may be greater than the reference level REF.

When the amplitude of the filtered receive signal RX_f is not greater than the reference level REF, in operation S150, the NFC reader 100 may adjust the amplification gain GA_amp or the attenuation ratio RT_att. In an exemplary embodiment, the NFC reader 100 may decrease the amplification gain GA_amp or the attenuation ratio RT_att as much as a given magnitude. Afterwards, the NFC reader 100 may perform operation S120 to operation S140 based on the adjusted amplification gain GA_amp and the adjusted attenuation ratio RT_att.

When the amplitude of the filtered receive signal RX_f is greater than the reference level REF, in operation S160, the NFC reader 100 may store information about the amplification gain GA_amp and the attenuation ratio RT_att. In operation S170, the NFC reader 100 may perform near field communication with the NFC card 101 based on the stored information (i.e., the amplification gain GA_amp and the attenuation ratio RT_att).

In an exemplary embodiment, in the case where the amplitude of the filtered receive signal RX_f is smaller than the reference level REF, an attenuation amount of the reference level REF may decrease by reducing the attenuation ratio RT_att. However, in this case, the level of the receive signal RX may exceed the given range, or noise may decrease relatively less, resulting in a decrease of the efficiency of communication of an NFC reader.

In contrast, the NFC reader 100 according to the inventive concept may adjust the attenuation ratio RT_att and the amplification gain GA_amp together based on the receive signal RX. For example, in the case where the amplitude of the filtered receive signal RX_f is smaller than the reference level REF, both the amplification gain GA_amp and the attenuation ratio RT_att may decrease. In this case, as the amplification gain GA_amp decreases, the level of the receive signal RX may relatively decrease. However, because the attenuation ratio RT_att relatively decreases, the level of the receive signal RX may be attenuated relatively less, and thus, the level of the receive signal RX may be within the given range. That is, the NFC reader 100 according to the inventive concept may adjust both the attenuation ratio RT_att and the amplification gain GA_amp based on the receive signal RX, and thus, the efficiency of communication may be maximized in various communication environments.

In an exemplary embodiment, the operations according to the flowchart of FIG. 7A may be performed while the NFC reader 100 performs an operation of detecting the NFC card 101. Alternatively, the operations according to the flowchart of FIG. 7A may be performed after the NFC reader 100 performs an operation of detecting the NFC card 101 and before the NFC reader 100 actually performs near field communication.

In an exemplary embodiment, operation S160 and operation S170 may be omitted. For example, the NFC reader 100 may receive data from the NFC card 101 through operation S120 and operation S130. That is, the NFC reader 100 according to an embodiment of the inventive concept may be configured to adjust the amplification gain GA_amp and the attenuation ratio RT_att in real time while performing near field communication with the NFC reader 100.

In an exemplary embodiment, the amplification gain GA_amp and the attenuation ratio RT_att stored in operation S160 may be used for the near field communication with the NFC card 101. Alternatively, the amplification gain GA_amp and the attenuation ratio RT_att stored in operation S160 may be used as initial values for the subsequent gain control operation, in which the amplification gain GA_amp and the attenuation ratio RT_att are adjusted.

The method of FIG. 7A may be varied in other embodiments. For instance, instead of comparing the filtered receive signal RF_f to the reference level REF in operation S140, the attenuated receive signal RT_att may be compared to the reference level REF. In another alternative embodiment, instead of comparing the filtered receive signal RX_f to the reference level REF and adjusting GA_amp or RT_att based on the comparison, GA_amp or RT_att may be adjusted based on a different signal quality criteria such as signal to noise ratio or bit-to-error ratio. When the signal quality criteria is not satisfied, adjustment in GA_amp and/or RT_att may continue in operation S150, until the signal quality criteria is satisfied. For instance, if signal-to-noise level is above a threshold, additional adjustment of GA_amp and RT_att may be omitted, whereby the flow may proceed to operation 160. Alternatively, a bit-to-error ratio may be tested using a protocol that establishes an initial test sequence of bits, prior to reading actual reception data from the NFC card 101. If the tested bit-to-error ratio is above a threshold for current test values for GA_amp and RT_att, additional adjustment of GA_amp and RT_att may likewise be omitted.

Figure 7B:
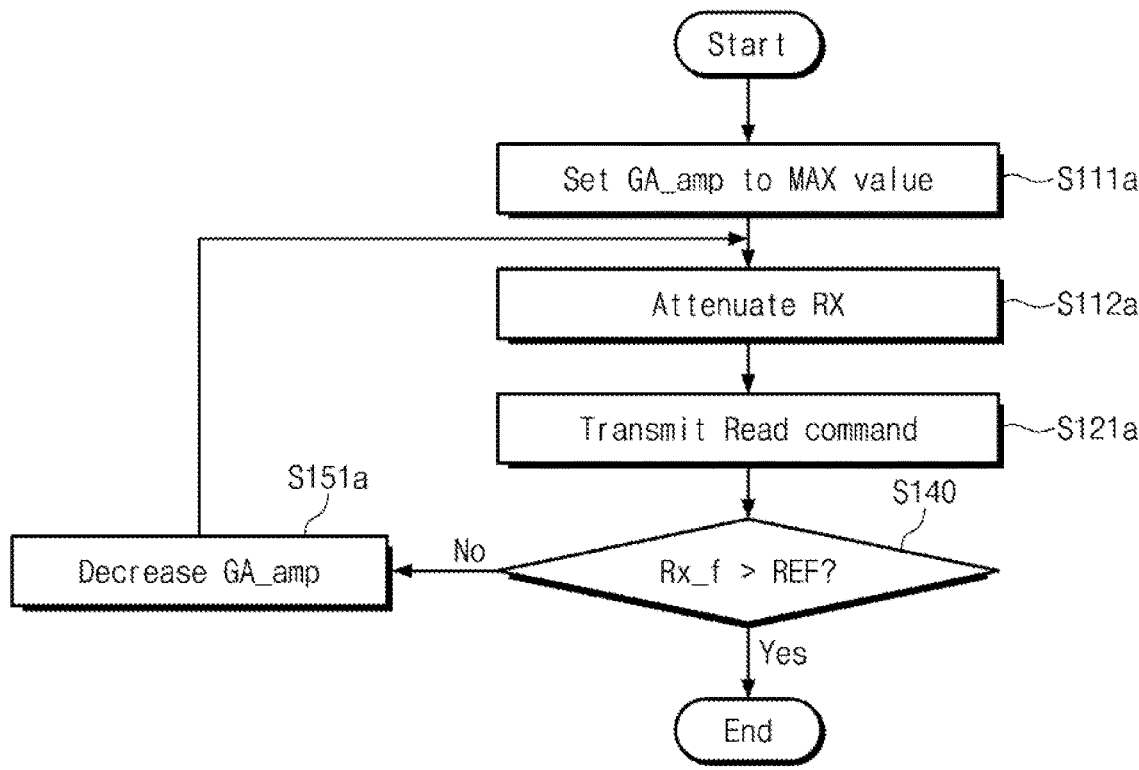
FIGS. 7B and 7C are flowcharts illustrating an operation according to the flowchart of FIG. 7A in detail.
Figure 7C:
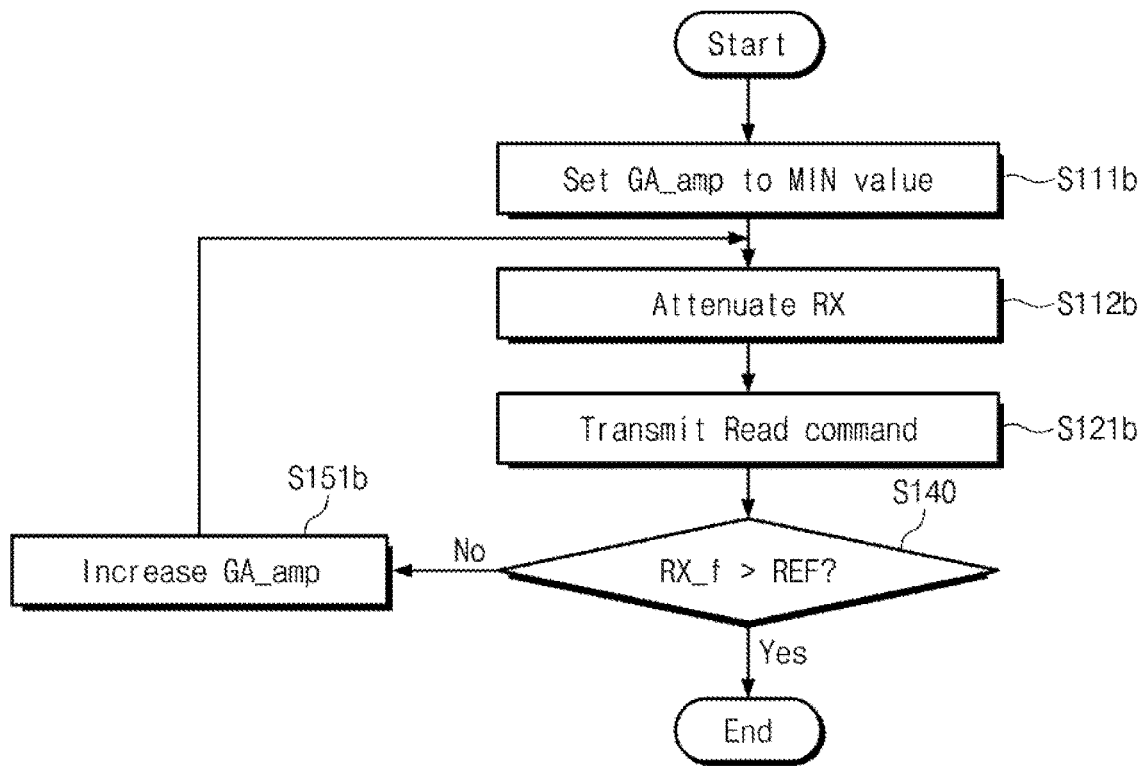

FIGS. 7B and 7C are flowcharts illustrating an operation of the NFC reader 100 according to the flowchart of FIG. 7A in detail. First, referring to FIGS. 4 and 7A, in operation S111a, the NFC reader 100 may set the amplification gain GA_amp of the variable amplifier 113 into the maximum value. For example, the NFC reader 100 may set the amplification gain GA_amp to the maximum value such that all the drivers DR included in the variable amplifier 113 are activated. Alternatively, the NFC reader 100 may set the amplification gain GA_amp to the maximum value within the given range.

In operation S112a, the NFC reader 100 may attenuate the receive signal RX. In this case, the NFC reader 100 may attenuate the receive signal RX based on the attenuation ratio RT_att. In an exemplary embodiment, the attenuation ratio RT_att may be determined or adjusted based on the amplification gain GA_amp set in operation S111a. Alternatively, the attenuation ratio RT_att may correspond to the amplification gain GA_amp set in operation S111a. In an exemplary embodiment, as the amplification gain GA_amp increases, the attenuation ratio RT_att may increase; as the amplification gain GA_amp decreases, the attenuation ratio RT_att may decrease.

In operation S121a, the NFC reader 100 may transmit a read command. Operation S121a is similar to operation S120 of FIG. 7, and thus, redundant description thereof is omitted.

In operation S140, the NFC reader 100 may compare the filtered receive signal RX_f and the reference level REF. Operation S140 is similar to operation S140 of FIG. 7A, and thus, additional description will be omitted to avoid redundancy.

When the filtered receive signal RX_f is not greater than the reference level REF, in operation S151a, the NFC reader 100 may decrease the amplification gain GA_amp. For example, the NFC reader 100 may decrease the amplification gain GA_amp as much as a given magnitude. Afterwards, the NFC reader 100 may repeatedly perform operation S112a to operation S140. In an exemplary embodiment, in the case where the amplification gain GA_amp decreases, the attenuation ratio RT_att may be varied (or decreased) based on the decreased amplification gain GA_amp.

In an exemplary embodiment, operation 112a and operation S121a of FIG. 7B may correspond to operation S120 and operation S130 of FIG. 7A or may be included therein. That is, for convenience of description, the operations of the NFC reader 100 may be divided and described based on various references, but the inventive concept is not limited thereto. For example, the above operations may be performed in parallel, at the same time, or depending on various orders.

Next, referring to FIGS. 4 and 7C, in operation S111b, the NFC reader 100 may set the amplification gain GA_amp of the variable amplifier 113 into the minimum value. For example, the NFC reader 100 may set the amplification gain GA_amp to the minimum value such that one of the plurality of drivers DR included in the variable amplifier 113 is activated or a minimum number of drivers are activated. Alternatively, the NFC reader 100 may set the amplification gain GA_amp to the minimum value within the given range.

Afterwards, the NFC reader 100 may perform operation S112b, operation S121b, and operation S140. Operation S112b, operation S121b, and operation S140 are similar to operation S112a, operation S121a, and operation S140 of FIG. 7B, and thus, additional description will be omitted to avoid redundancy.

When the filtered receive signal RX_f is not greater than the reference level REF, in operation S151b, the NFC reader 100 may increase the amplification gain GA_amp. For example, the NFC reader 100 may increase the amplification gain GA_amp as much as a given magnitude. Afterwards, the NFC reader 100 may repeatedly perform operation S112b to operation S140. In an exemplary embodiment, in the case where the amplification gain GA_amp increases, the attenuation ratio RT_att may be varied (or increased) based on the increased amplification gain GA_amp.

Figure 8A:
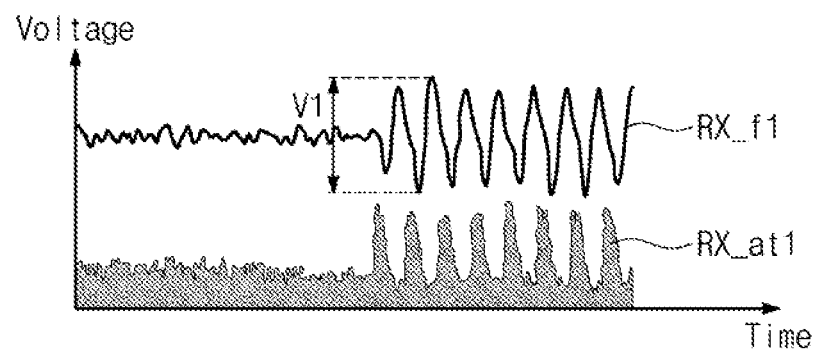
FIGS. 8A and 8B are graphs for describing an effect of an NFC reader operating based on the flowchart of FIG. 7A.
Figure 8B:
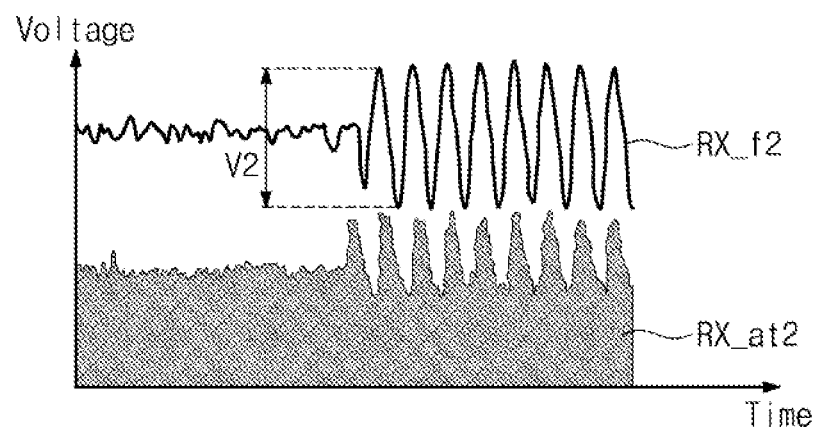

FIGS. 8A and 8B are graphs for describing an example effect of an NFC reader operating based on the flowchart of FIG. 7A. Graphs of FIG. 8A show an attenuated receive signal RX_at1 and a filtered receive signal RX_f1 when the amplification gain GA_amp of the variable amplifier 113 is set to the maximum value, and graphs of FIG. 8B show an attenuated receive signal RX_at2 and a filtered receive signal RX_f2 when the amplification gain GA_amp of the variable amplifier 113 is set to a value below the maximum value, e.g., half the maximum value.

As illustrated in FIGS. 8A and 8B, in an exemplary embodiment, when the amplification gain GA_amp of the variable amplifier 113 is set to the maximum value, the attenuation ratio RT_att may be set to a first value such that the level of the receive signal RX is within the given range; when the amplification gain GA_amp of the variable amplifier 113 is set to half the maximum value, the attenuation ratio RT_att may be set to a second value, lower than the first value, such that the level of the receive signal RX is also within the given range. According to the attenuation ratio set depending on each amplification gain, the first and second receive signals RX_at1 and RX_at2 thus attenuated may have waveforms as illustrated in FIGS. 8A and 8B.

In this case, as illustrated in FIG. 8A, when the amplification gain GA_amp of the variable amplifier 113 is set to the maximum value, the amplitude of the filtered first receive signal RX_f1 may be a first amplitude V1; as illustrated in FIG. 8B, when the amplification gain GA_amp of the variable amplifier 113 is set to half the maximum value, the amplitude of the filtered second receive signal RX_f2 may be a second amplitude V2. Here, the first amplitude V1 may be smaller than the second amplitude V2 (under the assumption that the physical distance between the NFC reader 100 and the NFC card 101 is the same for the two measurements). Since the second amplitude V2 is higher than the first amplitude V1, communication quality and/or efficiency may be improved.

Thus, in an exemplary embodiment, as an amplitude of a filtered receive signal becomes relatively greater, the efficiency of communication of the NFC reader 100 may be improved. Also, as an amplitude of a filtered receive signal becomes relatively greater for a given physical distance between the NFC reader 100 and the NFC card 101, the physical distance at which the NFC card 101 may be recognizable by the NFC reader 100 may increase.

That is, as described above, the controller 130 may control the amplification gain GA_amp of the variable amplifier 113 and the attenuation ratio RT_att of the variable attenuator 114 based on the receive signal RX, and thus, the efficiency of communication of the NFC reader 100 may be improved.

Figure 9:
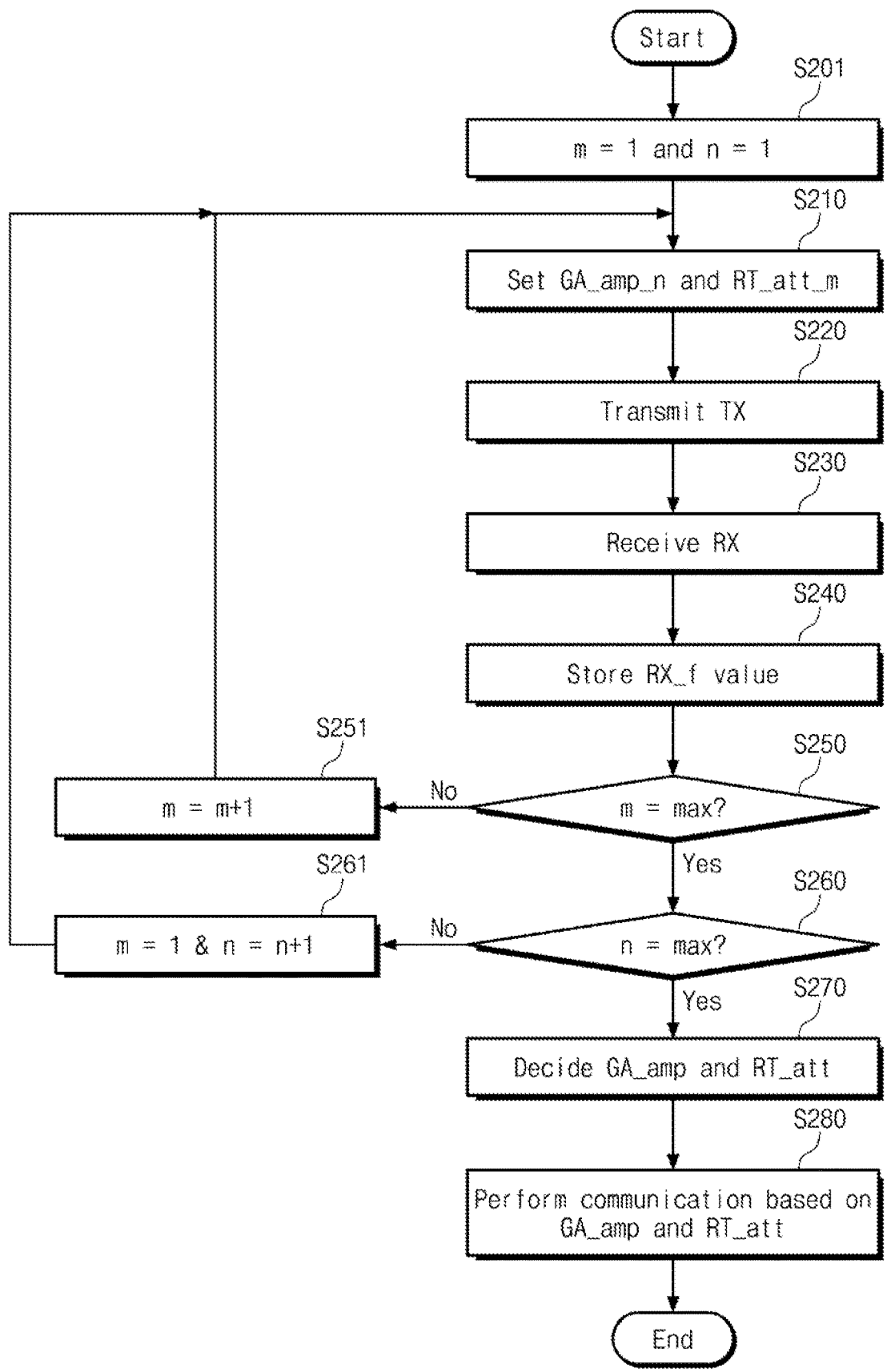
FIG. 9 is a flowchart illustrating an operation of an NFC reader of FIG. 4.

FIG. 9 is a flowchart illustrating an operation of an NFC reader of FIG. 4. For convenience, the description will be given as the flowchart of FIG. 9 is performed by the NFC reader 100. Referring to FIGS. 4 and 9, in operation S201, variables "m" and "n" are set to "1". The variables "m" and "n" set in operation S201 are only for describing an iterative operation for adjusting the amplification gain GA_amp and the attenuation ratio RT_att, and the inventive concept is not limited thereto.

In operation S210, the NFC reader 100 sets an n-th amplification gain GA_amp n and an m-th attenuation ratio RT_att m. For example, because the variables "m" and "n" are set to "1" in operation S201, the NFC reader 100 may set a first amplification gain GA_amp_1 and a first attenuation ratio RT_att_1. The first amplification gain GA_amp_1 may be a maximum amplification gain of the variable amplifier 113, and the first attenuation ratio RT_att_1 may be a value that allows the level of the attenuated receive signal RX_at to be within the given range when the transmission signal TX generated based on the first amplification gain GA_amp_1 is output to the antenna circuit 120.

The NFC reader 100 may perform operation S220 and operation S230. Operation S220 and operation S230 are similar to operation S120 and operation S130 of FIG. 7A, and thus, additional description will be omitted to avoid redundancy.

In operation S240, the NFC reader 100 may store the filtered receive signal RX_f. For example, the NFC reader 100 may store a value associated with the amplitude of the filtered receive signal RX_f.

In operation S250, the NFC reader 100 may determine whether the variable "m" is the maximum value. For example, whether a variable attenuation ratio RT_att m exists with regard to the n-th amplification gain GA_amp n currently set may be determined. In other words, whether the remaining attenuation ratio RT_att allowing the attenuated receive signal RX_at to be within the given range exists with regard to the transmission signal TX output based on the n-th amplification gain GA_amp n currently set may be determined. That the variable "m" is the maximum value may mean that the remaining attenuation ratio RT_att does not exist.

That is, when the variable "m" is not the maximum value, in operation S251, the variable "m" may increase as much as "1", and the NFC reader 100 may perform operation S210 to operation S250. That is, the NFC reader 100 may store an amplitude of a filtered receive signal generated by filtering the receive signal RX_at attenuated based on another attenuation ratio. With regard to one amplification gain GA_amp, the NFC reader 100 may store information about amplitudes of the filtered receive signals RX_f, which are generated by filtering the receive signals RX_at attenuated based on at least one or more attenuation ratios.

When the variable "m" is the maximum value, in operation S260, the NFC reader 100 may determine whether the variable "n" is the maximum value. For example, whether the variable amplification gain GA_amp is present at the variable amplifier 113 may be determined. In other words, whether the remaining amplification gain other than previously set amplification gains exists may be determined.

In the case where the variable "n" is not the maximum value, in operation S261, the variable "m" is set to "1", and the variable "n" increases as much as "1". Afterwards, the NFC reader 100 may repeatedly perform operation S210 to operation S250. That is, the NFC reader 100 may repeatedly perform operation S210 to operation S250 based on another amplification gain GA_amp and may store an amplitude value of the filtered receive signal RX_f.

When the variable "n" is the maximum value, in operation S270, the NFC reader 100 may decide the amplification gain GA_amp and the attenuation ratio RT_att for near field communication. For example, the amplification gain GA_amp and the attenuation ratio RT_att corresponding to the greatest value of values (i.e., amplitudes of the filtered receive signal RX_f) stored as a result of repeatedly performing operation S210 to operation S260 may be decided as the amplification gain GA_amp and the attenuation ratio RT_att for near field communication.

In operation S280, the NFC reader 100 may perform near field communication based on the decided amplification gain GA_amp and the decided attenuation ratio RT_att.

As described above, the NFC reader 100 according to an embodiment of the inventive concept may decide the amplification gain GA_amp and the attenuation ratio RT_att capable of improving the efficiency of communication, by comparing amplitudes of the filtered receive signal RX_f based on a plurality of given amplification gains GA_amp and a plurality of given attenuation ratios RT_att. Accordingly, as the amplification gain GA_amp and the attenuation ratio RT_att are adjusted together, the efficiency of communication of the NFC reader 100 may be improved.

Figure 10:
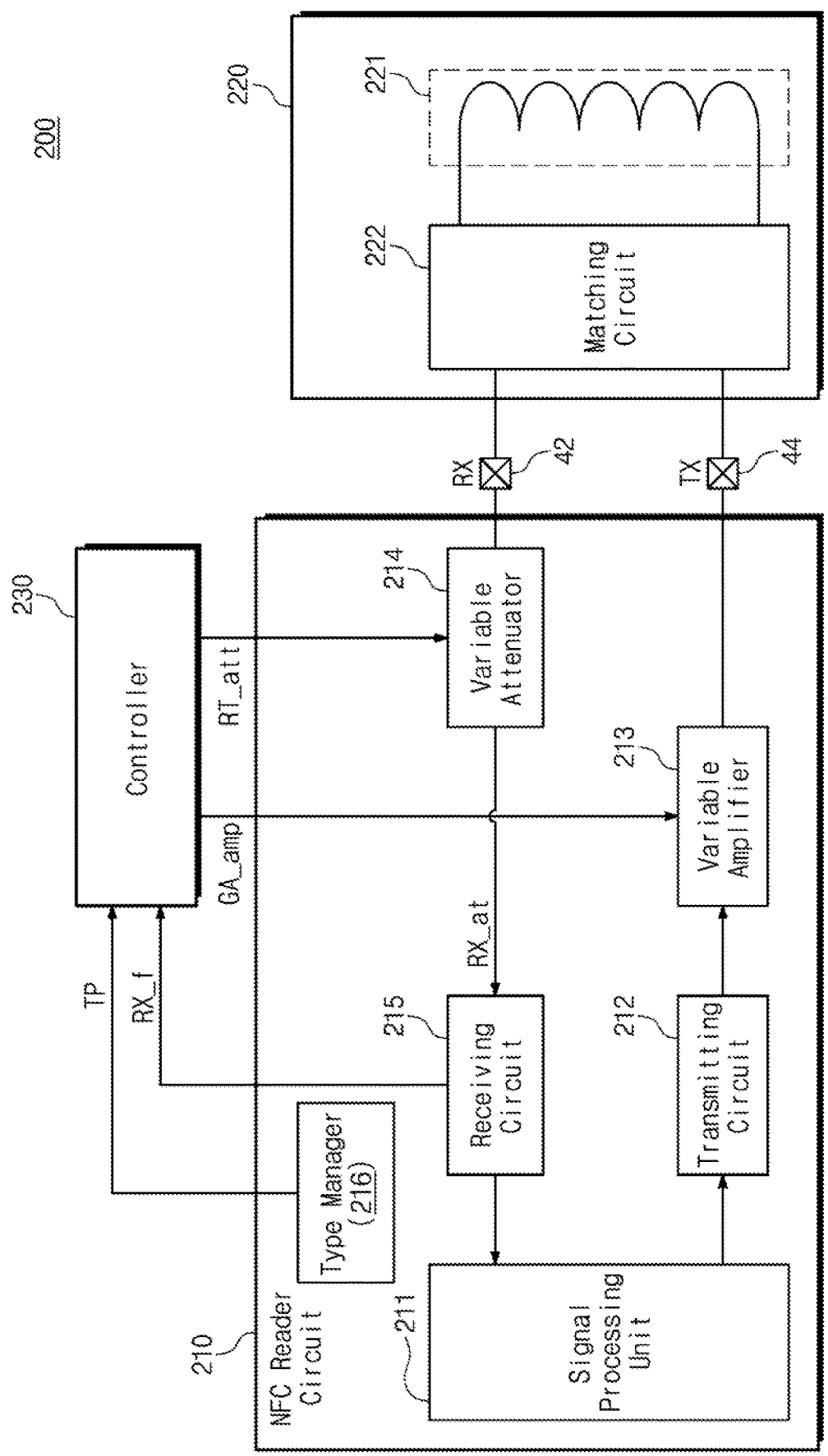
FIG. 10 is a block diagram illustrating an NFC reader according to an embodiment of the inventive concept.

FIG. 10 is a block diagram illustrating an NFC reader according to an embodiment of the inventive concept. Referring to FIG. 10, an NFC reader 200 may include an NFC reader circuit 210, an antenna circuit 220, and a controller 230. The NFC reader circuit 210 may include a signal processing unit 211, a transmission circuit 212, a variable amplifier 213, a variable attenuator 214, a reception circuit 215, and a type manager 216. The antenna circuit 220 may include an antenna 221 and a matching circuit 222. The NFC reader circuit 210, the antenna circuit 220, the signal processing unit 211, the transmission circuit 212, the variable amplifier 213, the variable attenuator 214, the reception circuit 215, the antenna 221, and the matching circuit 222 are described above, and thus, additional description will be omitted to avoid redundancy.

The type manager 216 may be configured to manage a near field communication type (NFC Type) of the NFC card 101 (refer to FIG. 2) performing near field communication with the NFC reader 100. For example, the NFC reader 100 may communicate with the NFC card 101 (refer to FIG. 2) based on at least one of various NFC types defined by the NFC protocol. In an exemplary embodiment, the NFC types defined by the NFC protocol may include TYPE A, TYPE B, TYPE F, and TYPE V, but the inventive concept is not limited thereto.

The type manager 216 may determine the NFC type based on a sub-carrier signal of data received from the NFC card 101. The signal processing unit 211 may demodulate the data received from the NFC card 101 based on the NFC type determined by the type manager 216.

In an exemplary embodiment, the controller 230 may adjust the amplification gain GA_amp and the attenuation ratio RT_att based on an NFC type TP determined by the type manager 216. For example, in the case where the NFC type TP is determined as a first type by the type manager 216, the controller 230 may set the amplification gain GA_amp to a first value; in the case where the NFC type TP is determined as a second type by the type manager 216, the controller 230 may set the amplification gain GA_amp to a second value. In an exemplary embodiment, the first type may correspond to TYPE V, the second type may correspond to TYPE A, TYPE B, or TYPE F, and the first value may be smaller than the second value. That is, with regard to a specific NFC type, the NFC reader 100 may perform near field communication by using the amplification gain GA_amp relatively smaller than other NFC types.

Figure 11:
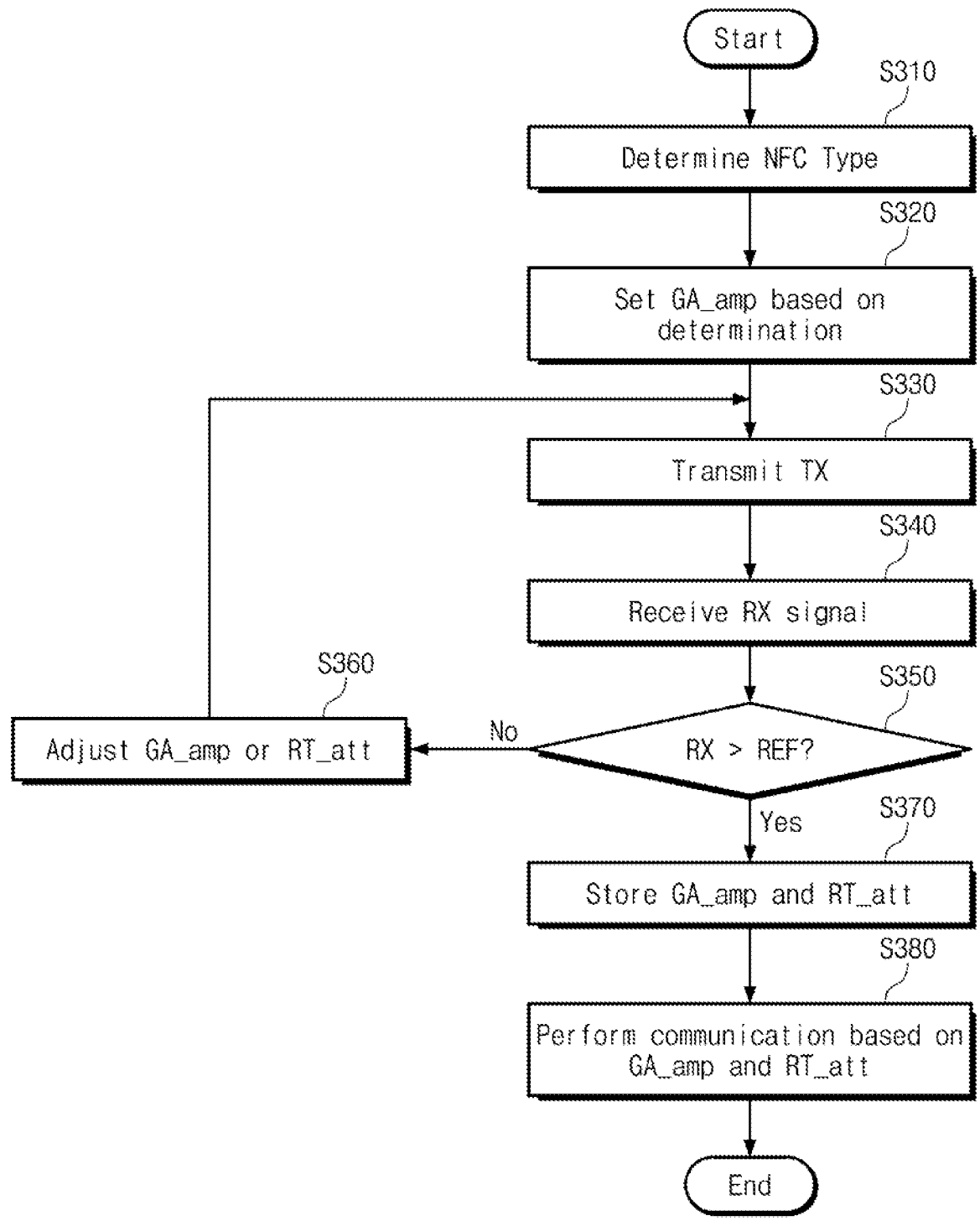
FIG. 11 is a flowchart illustrating an operation of an NFC reader of FIG. 10.
Figure 12:
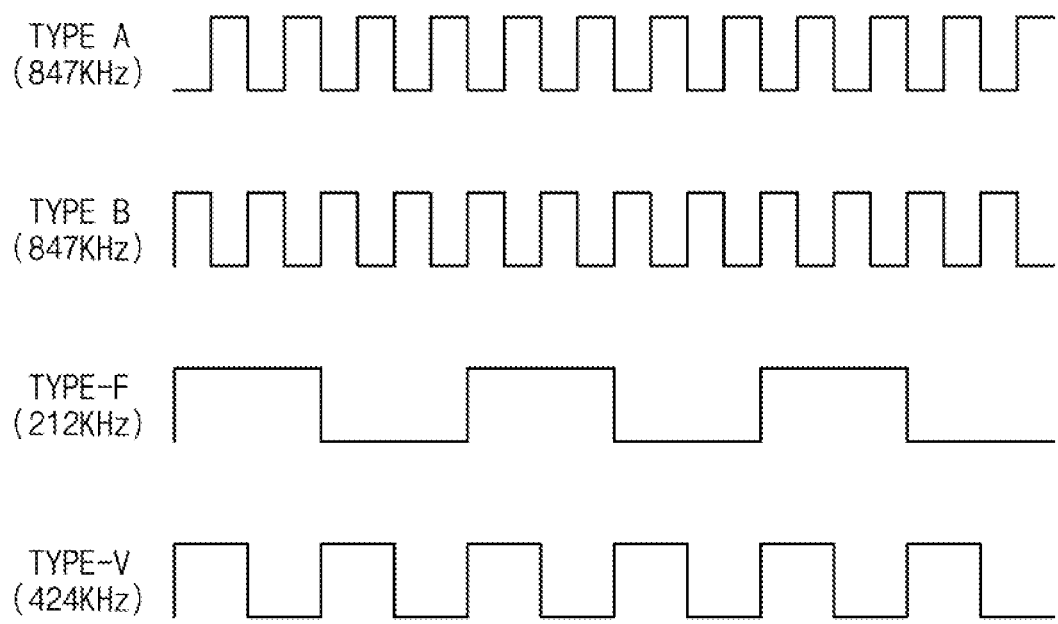
FIG. 12 is a diagram illustrating sub-carrier signals corresponding to various NFC types.

FIG. 11 is a flowchart illustrating an operation of an NFC reader of FIG. 10. FIG. 12 is a diagram illustrating sub-carrier signals corresponding to various NFC types. Referring to FIGS. 10 to 12, in operation S310, the NFC reader 200 may determine an NFC type. For example, as illustrated in FIG. 12, the NFC reader 200 may communicate with the NFC card 101 (refer to FIG. 2) based on one of TYPE A, TYPE B, TYPE F, and TYPE V. A sub-carrier signal of TYPE A and TYPE B may have a frequency of 847 KHz, a sub-carrier signal of TYPE F may have a frequency of 212 KHz, and a sub-carrier signal of TYPE V may have a frequency of 424 KHz. The sub-carrier signal may be a signal that is used for the NFC card 101 to modulate data. That is, the NFC card 101 may modulate data based on a sub-carrier corresponding to a given NFC type. In an exemplary embodiment, frequencies of sub-carrier signals corresponding to various NFC types illustrated in FIG. 12 are exemplary, and the inventive concept is not limited thereto. For example, a sub-carrier of TYPE V may be 424 KHz or 484 KHz.

In an exemplary embodiment, the NFC type of the NFC reader 200 may be decided in advance. Alternatively, the NFC reader 200 may decide an NFC type by detecting a pattern corresponding to each type, in the process for initial communication with the NFC card 101. Alternatively, the NFC reader 200 may provide a polling signal corresponding to each of various NFC types to the NFC card 101, and the NFC card 101 may respond to the polling signal corresponding to the given NFC type. The NFC reader 200 may determine an NFC type based on a response from the NFC card 101.

In operation S320, the NFC reader 200 may set the amplification gain GA_amp based on the decided NFC type. For example, in the case where the NFC type is decided as the first type, the NFC reader 200 may set the amplification gain GA_amp to the first value. In the case where the NFC type is decided as the second type, the NFC reader 200 may set the amplification gain GA_amp to the second value. In an exemplary embodiment, the first type may correspond to TYPE V, and the second type may correspond to TYPE A, TYPE B, or TYPE F. In this case, the first value may be smaller than the second value. That is, with regard to a specific NFC type, the NFC reader 200 may perform near field communication by using an amplification gain smaller than other NFC types.

Afterwards, the NFC device 200 may perform operations S330, S340, S350, S360, 5370 and S380. Operation S330 to operation S380 are similar to operation S120 to operation S170 of FIG. 7A, and thus, additional description will be omitted to avoid redundancy.

Figure 13:
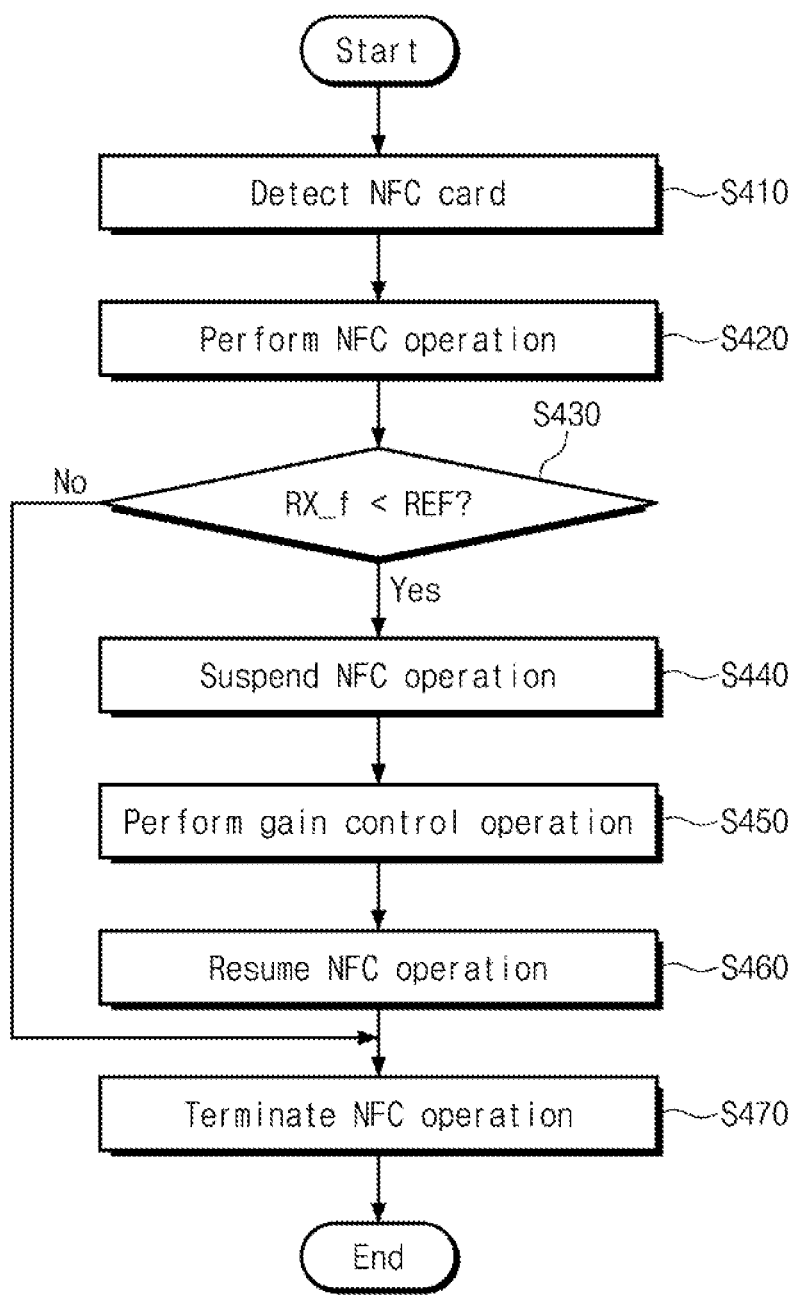
FIG. 13 is a flowchart illustrating an operation of an NFC reader according to an embodiment of the inventive concept.

FIG. 13 is a flowchart illustrating an operation of an NFC reader according to an embodiment of the inventive concept. For convenience of description, an operation according to the flowchart of FIG. 13 will be described with reference to the NFC reader 100 of FIG. 4.

Referring to FIGS. 2, 4, and 13, in operation S410, the NFC reader 100 may detect the NFC card 101. For example, the NFC reader 100 may output the transmission signal TX and may detect whether to access the NFC card 101, based on the receive signal RX received from the NFC card 101. In an exemplary embodiment, while operation S410 is performed, the NFC reader 100 may adjust the amplification gain GA_amp and the attenuation ratio RT_att based on the operation methods described with reference to FIGS. 1 to 12.

In operation S420, the NFC reader 100 may perform the near field communication (NFC) with the NFC card 101. For example, the NFC reader 100 may perform near field communication with the NFC card 101 based on the communication manner defined by the NFC standard.

In operation S430, the NFC reader 100 may determine whether the level of the filtered receive signal RX_f is lower than the reference level REF. In an exemplary embodiment, operation S430 may be performed while operation S420 is performed. That is, the NFC reader 100 may detect that the sensitivity of the receive signal RX decreases, while performing a near field communication operation with the NFC card 101.

When the filtered receive signal RX_f level is lower than the reference level REF, in operation S440, the NFC reader 100 may suspend the near field communication operation being performed.

In operation S450, the NFC reader 100 may perform a gain control operation. For example, the NFC reader 100 may respectively control the amplification gain GA_amp of the variable amplifier 113 and the attenuation ratio RT_att of the variable attenuator 114, based on the operation methods described with reference to FIGS. 1 to 12. Detailed embodiments of the gain control operation of controlling the amplification gain GA_amp and the attenuation ratio RT_att are described above, and thus, additional description will be omitted to avoid redundancy.

After the gain control operation is completed, in operation S460, the NFC reader 100 may resume the suspended near field communication operation. After the resumed near field communication operation is completed, in operation S470, the NFC reader 100 may terminate the near field communication operation.

In an exemplary embodiment, in the case where the filtered receive signal RX_f is not smaller than the reference level REF while the NFC reader 100 performs the near field communication operation (i.e., No in operation S430), the NFC reader 100 may perform the near field communication operation without a separate gain control operation; after the near field communication operation is completed, the method may proceed to operation S470.

As described above, while the NFC reader 100 according to an embodiment of the inventive concept performs the near field communication operation with the NFC card 101, in the case where a receive signal level (e.g., an amplitude of the filtered receive signal RX_f) is lower than a reference level REF, the NFC reader 100 may perform the gain control operation described with reference to FIGS. 1 to 12. In other words, the NFC reader 100 according to an embodiment of the inventive concept may vary the amplification gain GA_amp of the variable amplifier 113 and the attenuation ratio RT_att of the variable attenuator 114 in real time while performing the near field communication operation. Accordingly, an NFC reader with improved reception performance is provided.

The embodiment variations discussed above for the operations of FIG. 7A, with regard to the adjustment of GA_amp or RT_att based on the receive signal level comparison to a reference level REF, may be applicable to those of FIGS. 7B, 7C, 11 and 13. Thus, in various alternative embodiments, instead of comparing the filtered receive signal RF_f to the reference level REF in connection with operations S270, S350 or S430, the attenuated receive signal RT_att may be compared to the reference level REF. In another alternative embodiment, instead of comparing the filtered receive signal RX_f to the reference level REF and adjusting GA_amp or RT_att based on the comparison, GA_amp or RT_att may be adjusted based on a different signal quality criteria such as signal to noise ratio or bit-to-error ratio.

Figure 14:
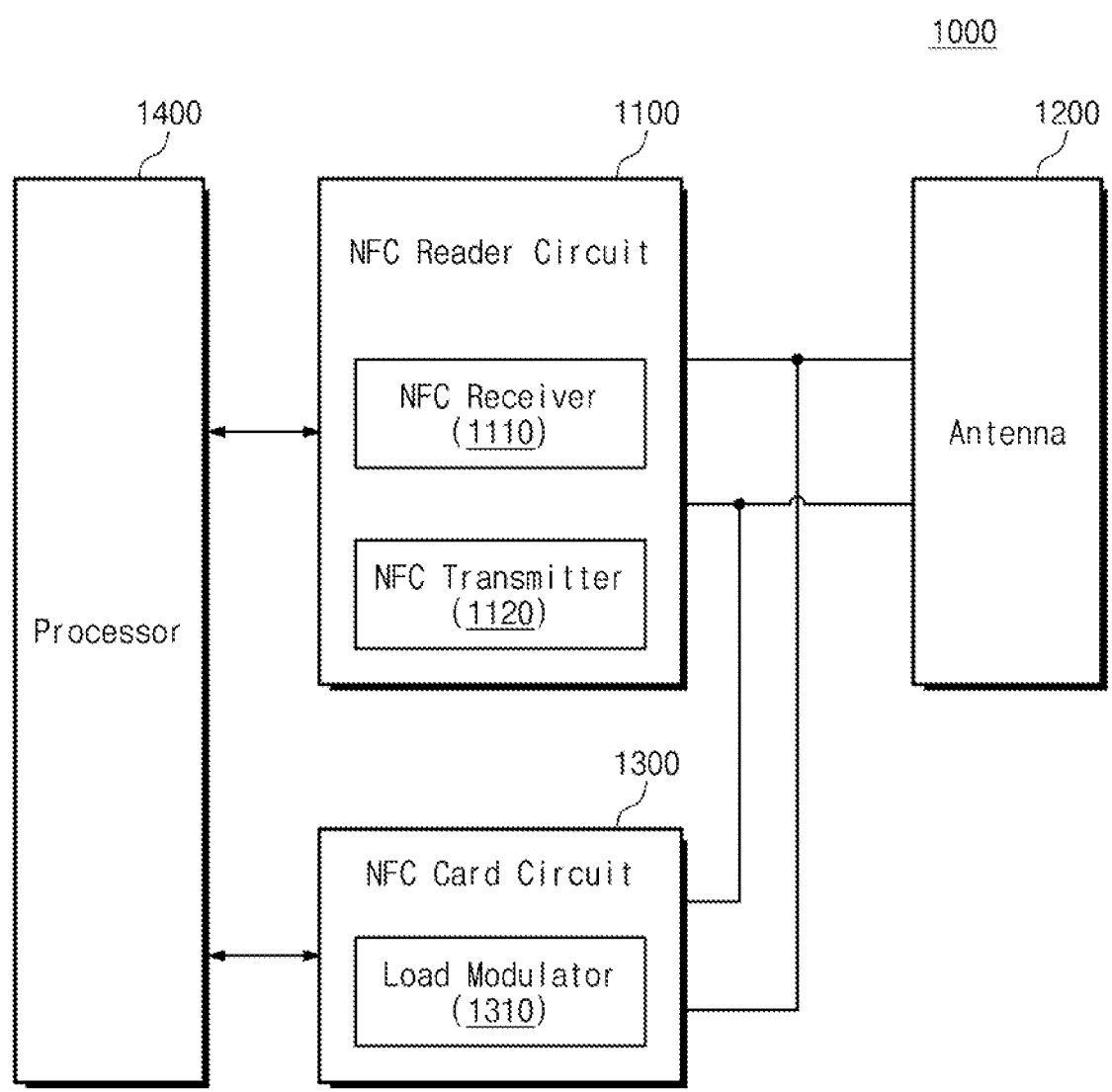
FIG. 14 is a block diagram illustrating an NFC device to which an NFC reader according to the inventive concept is applied.

FIG. 14 is a block diagram illustrating an example NFC device to which an NFC reader according to the inventive concept is applied. Referring to FIG. 14, an NFC device 1000 may include an NFC reader circuit 1100, an antenna circuit 1200, an NFC card circuit 1300, and a processor 1400. The NFC reader circuit 1100 may include an NFC receiver 1110 and an NFC transmitter 1120. The NFC receiver 1110 may include a variable attenuator and a reception circuit described with reference to FIGS. 1 to 13. The NFC transmitter 1120 may include a transmission circuit and a variable amplifier described with reference to FIGS. 1 to 13. Hence, the NFC reader circuit 1100 may be one of the NFC readers 100 and 200 described with reference to FIGS. 1 to 13, and may operate based on the operation method described with reference to FIGS. 1 to 13. The antenna circuit 1200 may include an antenna circuit described with reference to FIGS. 1 to 13. That is, although not illustrated, the NFC reader circuit 1100 may include a signal processing unit configured to perform signal processing (e.g., filtering and data demodulation) on a receive signal, to generate data provided from the NFC card 101 (refer to FIG. 2), and to transfer the generated data to the processor 1400.

The NFC card circuit 1300 may be configured to support an NFC card mode of the NFC device 1000. For example, the NFC card circuit 1300 may include a load modulator 1310. The load modulator 1310 may be configured to "load modulate" and output data in response to a request from another NFC device (e.g., an external NFC reader). In an exemplary embodiment, the load modulator 1310 may perform active load modulation (ALM) in which load modulation is performed by using power from a power source (not illustrated). Alternatively, the load modulator 1310 may perform passive load modulation (PLM) in which load modulation is performed without a separate power source.

The processor 1400 may be configured to control the NFC reader circuit 1100 and the NFC card circuit 1300, independently. For example, the processor 1400 may be configured to independently control the NFC reader circuit 1100 and the NFC card circuit 1300, based on an operation mode. In detail, in the case where the NFC device 1000 operates in a reader mode, the processor 1400 may activate the NFC reader circuit 1100. Alternatively, in the case where the NFC device 1000 operates in a card mode, the processor 1400 may activate the NFC card circuit 1300.

Although not illustrated, the NFC device 1000 may further include various function blocks for supporting any other operation mode (e.g., a P2P mode, a card emulation mode, or a reader/writer mode). Alternatively, the NFC device 1000 may further include an intellectual property (IP) block configured to support a protocol defined by the NFC standard.

Figure 15:
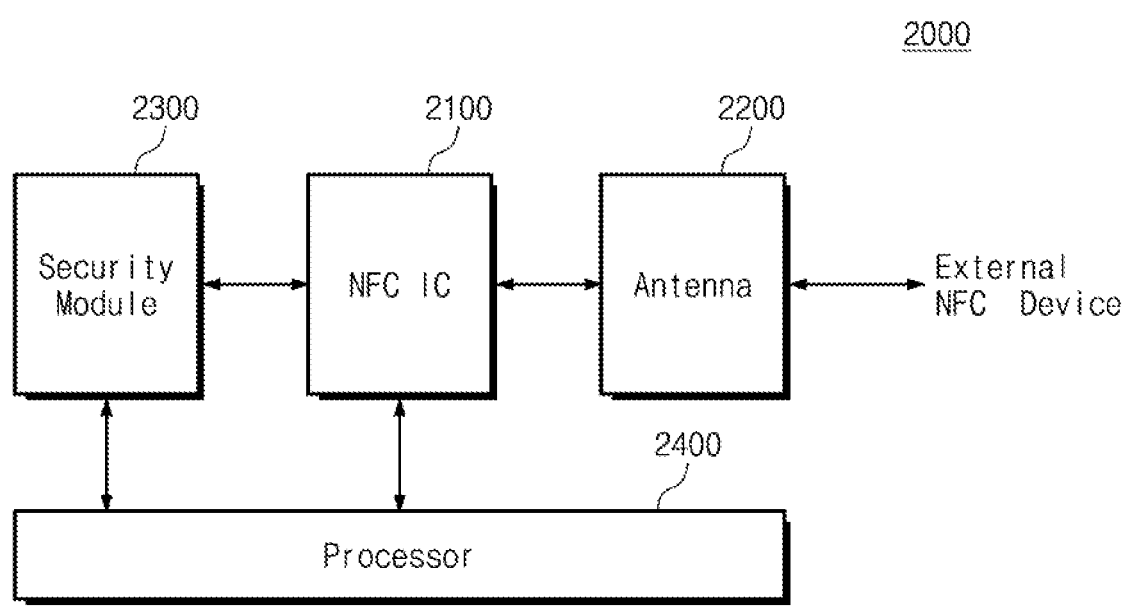
FIG. 15 is a block diagram illustrating an NFC device to which an NFC reader according to the inventive concept is applied.

FIG. 15 is a block diagram illustrating an NFC device to which an NFC reader according to the inventive concept is applied. Referring to FIG. 15, an NFC device 2000 may include an NFC integrated circuit 2100, an antenna circuit 2200, a security module 2300, and a processor 2400. The NFC integrated circuit 2100, the antenna circuit 2200, and the processor 2400 are described above, and thus, additional description will be omitted to avoid redundancy.

The security module 2300 may be configured to support a security operation of the NFC device 2000. For example, the NFC integrated circuit 2100 may perform near field communication. The near field communication may be used to exchange desired information such as financial payment and personal information transfer. In this case, information that is exchanged through the near field communication may be hacked by an external attacker. The security module 2300 may provide a security function to prevent the hacking by the external attacker. In detail, the security module 2300 may provide encrypted communication. Alternatively, the security module 2300 may be configured to allow the NFC integrated circuit 2100 to perform near field communication, based on authentication with an external server.

Figure 16:
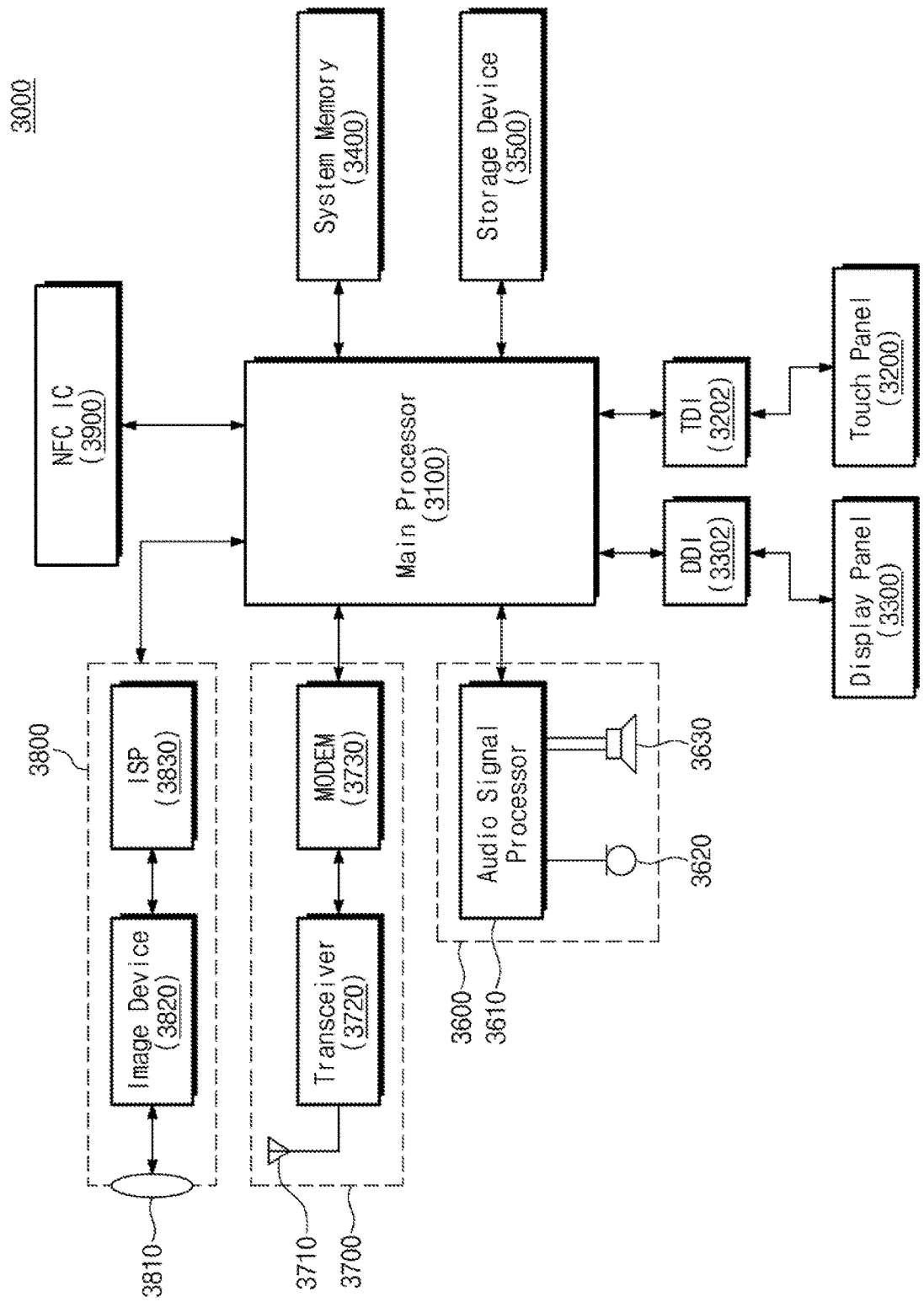
FIG. 16 is a block diagram illustrating an electronic device according to the inventive concept.

FIG. 16 is a block diagram illustrating an electronic device according to an embodiment of the inventive concept. Referring to FIG. 16, an electronic device 3000 may include a main processor 3100, a touch panel 3200, a touch driver integrated circuit 3202, a display panel 3300, a display driver integrated circuit 3302, a system memory 3400, a storage device 3500, an audio processor 3600, a communication block 3700, an image processor 3800, and an NFC integrated circuit 3900. In an exemplary embodiment, the electronic device 3000 may be one of various electronic devices such as a portable communication terminal, a personal digital assistant (PDA), a portable media player (PMP), a digital camera, a smartphone, a tablet computer, a laptop computer, and a wearable device.

The main processor 3100 may control overall operations of the electronic device 3000. The main processor 3100 may control/manage operations of the components of the electronic device 3000. The main processor 3100 may process various operations for the purpose of operating the electronic device 3000.

The touch panel 3200 may be configured to sense a touch input from a user under control of the touch driver integrated circuit 3202. The display panel 3300 may be configured to display image information under control of the display driver integrated circuit 3302.

The system memory 3400 may store data that are used for an operation of the electronic device 3000. For example, the system memory 3400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 3500 may store data regardless of whether a power is supplied. For example, the storage device 3500 may include at least one of various nonvolatile memories such as a flash memory, a PRAM, an MRAM, a ReRAM, and a FRAM. For example, the storage device 3500 may include an embedded memory and/or a removable memory of the electronic device 3000.

The audio processor 3600 may process an audio signal by using an audio signal processor 3610. The audio processor 3600 may receive an audio input through a microphone 3620 or may provide an audio output through a speaker 3630.

The communication block 3700 may exchange signals with an external device/system through an antenna 3710. A transceiver 3720 and a modulator/demodulator (MODEM) 2730 of the communication block 3700 may process signals exchanged with the external device/system in compliance with at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 3800 may receive light through a lens 3810. An image device 3820 and an image signal processor 3830 included in the image processor 3800 may generate image information about an external object, based on received light.

The NFC integrated circuit 3900 may be configured to perform near field communication with an NFC tag, an NFC card, or any other NFC device. The NFC integrated circuit 3900 may include the NFC reader described with reference to FIGS. 1 to 15 or may operate based on the operation method described with reference to FIGS. 1 to 15.

According to embodiments of the inventive concept, an NFC reader includes a variable amplifier amplifying a transmission signal and a variable attenuator attenuating a receive signal. The NFC reader may control an amplification gain of the variable amplifier and an attenuation ratio of the variable attenuator respectively depending on the receive signal level. Accordingly, a near field communication reader, of which reception performance is improved compared to a conventional NFC reader, an operation method of the near field communication reader, and an electronic device including the near field communication reader are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A contactless integrated circuit (IC) card reader configured to communicate with a contactless IC card, comprising:
   an antenna circuit;
   a transmission circuit configured to generate a carrier signal;
   a variable amplifier configured to amplify the carrier signal at an amplification gain and to output the amplified carrier signal to the antenna circuit as a transmit signal;
   a variable attenuator configured to attenuate a receive signal received through the antenna circuit at an attenuation ratio;
   a reception circuit configured to filter the carrier signal from the attenuated receive signal and to generate a filtered receive signal; and
   a controller configured to decrease the amplification gain and the attenuation ratio when an amplitude of the filtered receive signal is smaller than a reference level.

2. The contactless IC card reader of claim 1, wherein the receive signal is generated through use of a passive load modulation (PLM) performed by the contactless IC card.

3. The contactless IC card reader of claim 1, further comprising:
   a signal processing unit configured to demodulate the filtered receive signal using amplitude shift keying (ASK) demodulation to identify data provided from the contactless IC card.

4. The contactless IC card reader of claim 3, wherein the signal processing unit is further configured to modulate information to be provided to the contactless IC card using ASK modulation and to control the transmission circuit based on the modulated information.

5. The contactless IC card reader of claim 1, wherein the variable amplifier includes a plurality of drivers each configured to amplify the carrier signal,
   wherein each of the plurality of drivers is selectively activated in response to an amplification gain signal.

6. The contactless IC card reader of claim 1, wherein the variable attenuator includes:
   a variable resistance element connected between a reception terminal to which the receive signal is input and a ground terminal; and
   a capacitor connected between the reception terminal and the ground terminal.

7. The contactless IC card reader of claim 1, further comprising:
   a type manager configured to determine an NFC type of the contactless IC card,
   wherein the controller is further configured to control the amplification gain and the attenuation ratio based on the attenuated receive signal and the determined NFC type.

8. The contactless IC card reader of claim 7, wherein, when the determined NFC type is a first type, the controller controls the amplification gain to a first value, and wherein, when the determined NFC type is a second type, the controller controls the amplification gain to a second value smaller than the first value.

9. The contactless IC card reader of claim 8, wherein the first type corresponds to an NFC type which is based on a sub-carrier signal having a frequency of 424 KHz or 484 KHz.

10. The contactless IC card reader of claim 1, wherein the carrier signal has a frequency of 13.56 MHz.

11. The contactless IC card of claim 1, wherein the controller is configured to control the amplification gain and the attenuation ratio based on a signal-to-noise ratio of the attenuated receive signal.

12. The contactless C card of claim 1, wherein the controller is configured to control the amplification gain and the attenuation ratio based on a bit-to-error ratio of the attenuated receive signal.

13. An electronic device configured to support near field communication (NFC), comprising:
  a processor;
  an antenna circuit;
  an NFC reader circuit configured to receive reception data from an external NFC card through the antenna circuit based on passive load modulation (PLM), under control of the processor, in a reader mode; and
  an NFC card circuit configured to output modulated transmission data to the antenna circuit under control of the processor, in a card mode,
  wherein the NFC reader circuit includes:
  a variable amplifier configured to amplify a carrier signal at an amplification gain and to output the amplified carrier signal to the antenna circuit as a transmit signal;
  a variable attenuator configured to attenuate a receive signal received through the antenna circuit at an attenuation ratio, the receive signal including the reception data; and
  a controller configured to control the amplification gain and the attenuation ratio based on the attenuated receive signal,
  wherein, when an amplitude of a signal, which is generated by filtering the carrier signal from the attenuated receive signal, is smaller than a reference level, the controller decreases the amplification gain and the attenuation ratio.

14. The electronic device of claim 13, wherein the NFC reader circuit includes:
  a reception circuit configured to filter the carrier signal from the attenuated receive signal and to generate the filtered receive signal; and
  a signal processing unit configured to demodulate the filtered receive signal, generate the reception data, and transfer the reception data to the processor.

15. An operation method of a contactless integrated circuit (IC) card reader configured to communicate with a contactless IC card, the method comprising:
  setting each of an amplification gain and an attenuation ratio to first and second initial values, respectively;
  outputting a transmission signal amplified based on the amplification gain set to the first initial value;
  attenuating a receive signal received from the contactless IC card based on the attenuation ratio set to the second initial value and generating an attenuated receive signal;
  adjusting the amplification gain and the attenuation ratio respectively based on the attenuated receive signal and a reference level; and
  performing near field communication with the contactless IC card based on the adjusted amplification gain and the adjusted attenuation ratio,
  wherein the adjusting of the amplification gain and the attenuation ratio respectively based on the attenuated receive signal and the reference level includes:
  decreasing the amplification gain and the attenuation ratio, when an amplitude of a signal, which is generated by filtering a carrier signal from the attenuated receive signal, is smaller than the reference level.

16. The method of claim 15, wherein the first initial value of the amplification gain is a maximum value, and the second initial value of the attenuation ratio is decided based on the first initial value of the amplification gain.

17. The method of claim 15, further comprising:
  before setting each of the amplification gain and the attenuation ratio to the first and second initial values;
  determining an NFC type corresponding to the contactless IC card; and
  deciding the first and second initial values based on the determined NFC type.

* * * * *